US010523061B2

(12) United States Patent
Nakano et al.

(10) Patent No.: US 10,523,061 B2
(45) Date of Patent: Dec. 31, 2019

(54) POWER RECEIVING DEVICE, POWER FEEDING DEVICE, AND ELECTRONIC APPARATUS

(71) Applicant: Sony Corporation, Tokyo (JP)

(72) Inventors: Hiroaki Nakano, Kanagawa (JP); Ken Matsui, Kanagawa (JP); Kazukuni Takanohashi, Kanagawa (JP); Tomonori Tsuchiyama, Kanagawa (JP); Masayoshi Abe, Tokyo (JP); Osamu Kozakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 118 days.

(21) Appl. No.: 15/323,463

(22) PCT Filed: Jun. 24, 2015

(86) PCT No.: PCT/JP2015/068149
§ 371 (c)(1),
(2) Date: Jan. 3, 2017

(87) PCT Pub. No.: WO2016/006441
PCT Pub. Date: Jan. 14, 2016

(65) Prior Publication Data
US 2017/0149287 A1    May 25, 2017

(30) Foreign Application Priority Data

Jul. 9, 2014    (JP) .................................. 2014-141505

(51) Int. Cl.
*H02J 50/60*    (2016.01)
*H02J 50/12*    (2016.01)
(Continued)

(52) U.S. Cl.
CPC ............ *H02J 50/60* (2016.02); *H02J 7/0042* (2013.01); *H02J 7/025* (2013.01); *H02J 50/12* (2016.02); *H02J 50/80* (2016.02)

(58) Field of Classification Search
CPC ...................................................... H02J 50/60
See application file for complete search history.

(56) References Cited

U.S. PATENT DOCUMENTS

| 2009/0322280 A1* | 12/2009 | Kamijo | .................. H02J 7/025 320/108 |
| 2012/0091989 A1* | 4/2012 | Uramoto | ................. H02J 5/005 324/76.11 |

(Continued)

FOREIGN PATENT DOCUMENTS

| JP | 2009-033782 A | 2/2009 |
| JP | 2011-030422 A | 2/2011 |

(Continued)

OTHER PUBLICATIONS

"LC Oscillator Basics", Jul. 1, 2014, Electronics Tutorials, retrieved via WaybackMachine at <https://web.archive.org/web/20140701061554/https://www.electronics-tutorials.ws/oscillator/oscillators.html>. (Year: 2014).*

(Continued)

*Primary Examiner* — Rexford N Barnie
*Assistant Examiner* — David A Shiao
(74) *Attorney, Agent, or Firm* — Michael Best & Friedrich LLP

(57) ABSTRACT

A power receiving device of the disclosure includes a power generator, a detector, and a controller. The power generator includes a power receiving element that receives a power signal supplied in a wireless manner from a power feeding device, and generates direct current power on the basis of the power signal. The detector includes a detection element, and drives the detection element and detects an alternating (Continued)

current signal generated in the detection element, during a power receiving period in which the power receiving element receives the power signal. The controller controls the power feeding device on the basis of a detection result of the detector.

10 Claims, 16 Drawing Sheets

(51) Int. Cl.
*H02J 7/02* (2016.01)
*H02J 7/00* (2006.01)
*H02J 50/80* (2016.01)

(56) References Cited

U.S. PATENT DOCUMENTS

| | | | | |
|---|---|---|---|---|
| 2012/0146580 A1* | 6/2012 | Kitamura | ................ | H01F 38/14 320/108 |
| 2013/0099592 A1* | 4/2013 | Abe | ................ | H02J 5/005 307/104 |
| 2013/0241300 A1* | 9/2013 | Miyamoto | ................ | H01F 5/003 307/104 |
| 2014/0001881 A1* | 1/2014 | Murakami | ................ | H02J 5/005 307/104 |
| 2014/0015522 A1* | 1/2014 | Widmer | ................ | G01D 5/2006 324/239 |
| 2014/0077617 A1* | 3/2014 | Nakano | ................ | H04B 5/0037 307/104 |
| 2014/0103733 A1* | 4/2014 | Irie | ................ | H02J 5/005 307/104 |
| 2014/0111154 A1* | 4/2014 | Roy | ................ | G01V 3/081 320/108 |
| 2015/0311725 A1* | 10/2015 | Yamamoto | ................ | G01V 3/104 307/104 |
| 2015/0321567 A1* | 11/2015 | Czainski | ................ | B60L 11/182 191/10 |
| 2015/0349543 A1* | 12/2015 | Sakata | ................ | H02J 5/005 307/104 |
| 2016/0028248 A1* | 1/2016 | Asanuma | ................ | H02J 17/00 307/104 |
| 2017/0005505 A1* | 1/2017 | Yamanishi | ................ | H02J 7/1461 |

FOREIGN PATENT DOCUMENTS

| | | |
|---|---|---|
| JP | 2012-016125 A | 1/2012 |
| JP | 2013-192391 A | 9/2013 |
| JP | 2014-007838 A | 1/2014 |
| WO | 2012/070479 A1 | 5/2012 |
| WO | 2013/061613 A1 | 5/2013 |

OTHER PUBLICATIONS

"Colpitts Oscillator", Feb. 28, 2014, Electronics Tutorials, retrieved via WaybackMachine at <https://web.archive.org/web/20140228203216/ https://www.electronics-tutorials.ws/oscillator/colpitts.html>. (Year: 2014).*

Japanese Office Action dated Nov. 12, 2019 for corresponding Japanese Application No. 2016-532861.

* cited by examiner

[ FIG. 1 ]
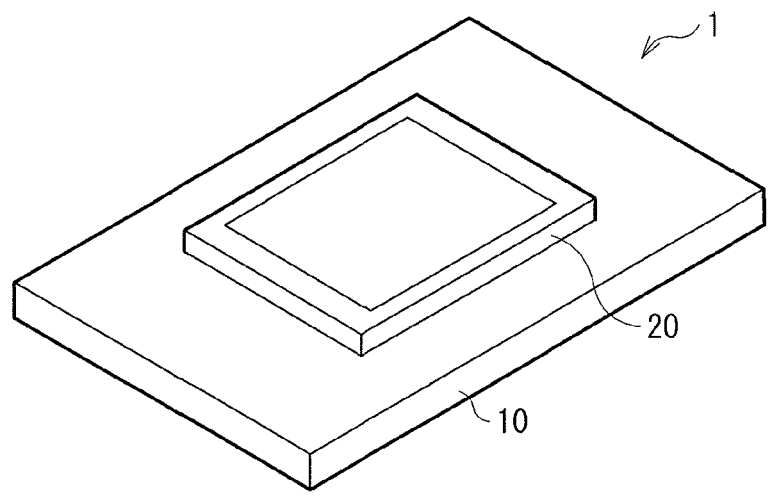
[ FIG. 2 ]
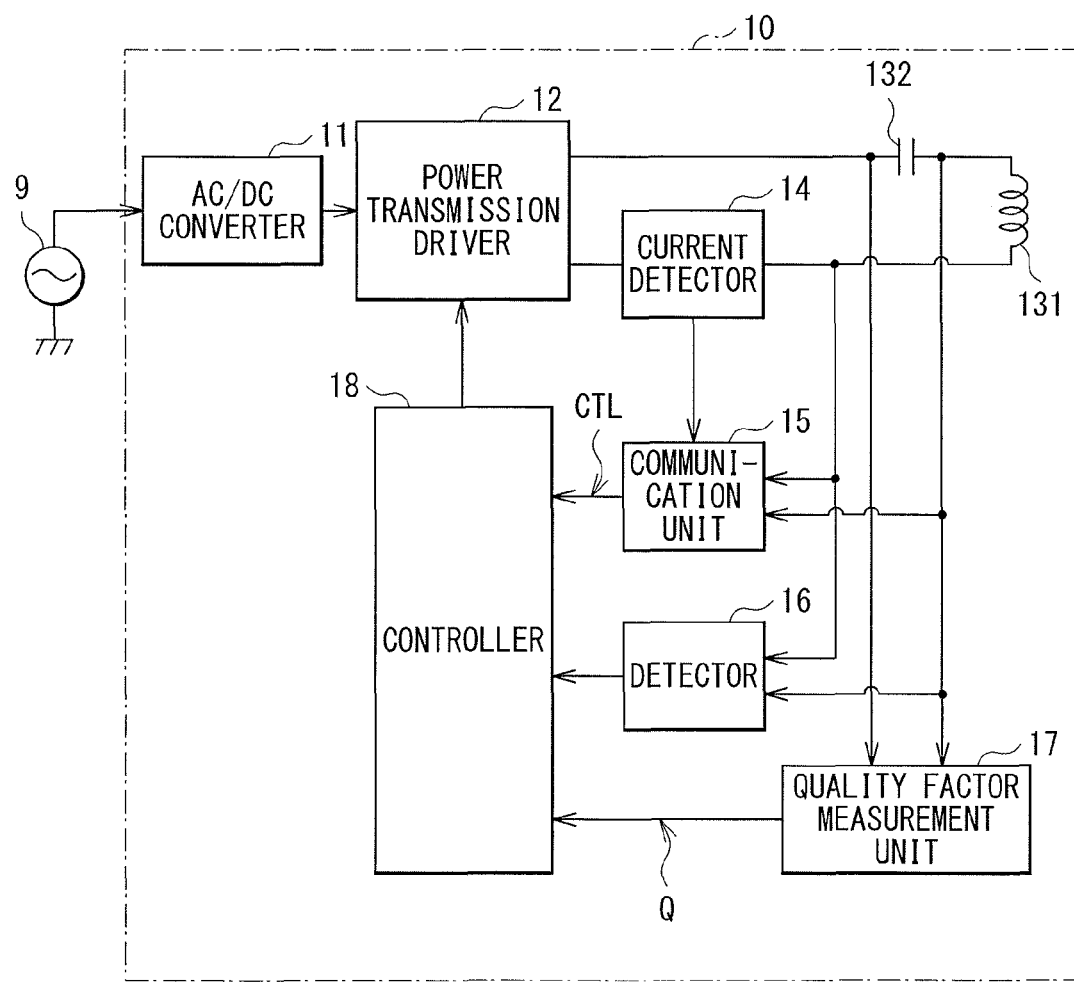

[ FIG. 3 ]
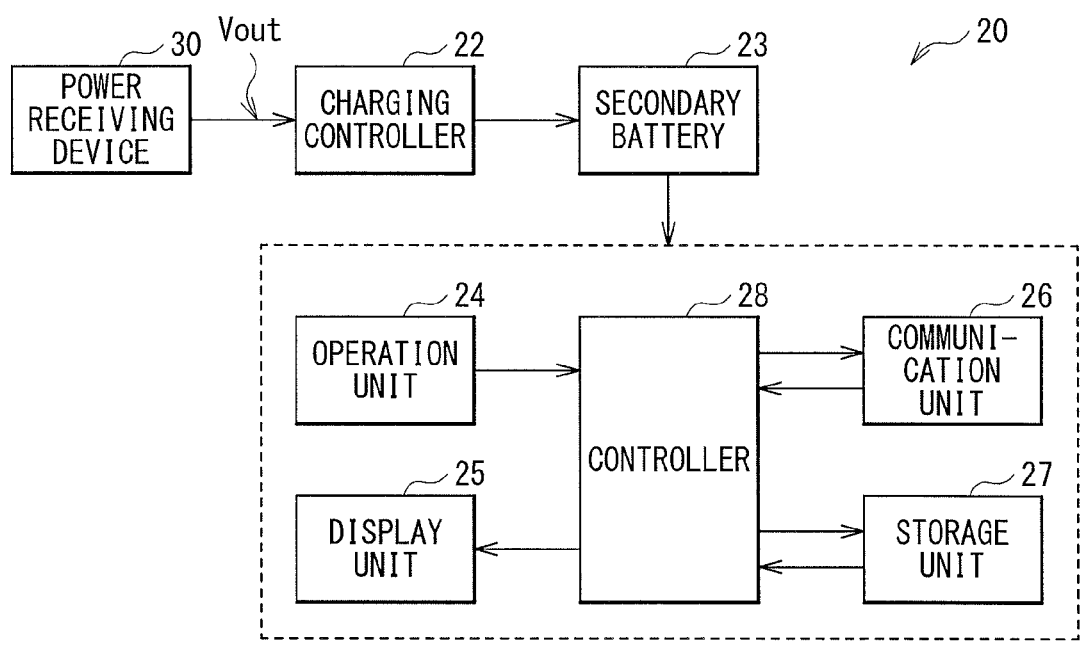

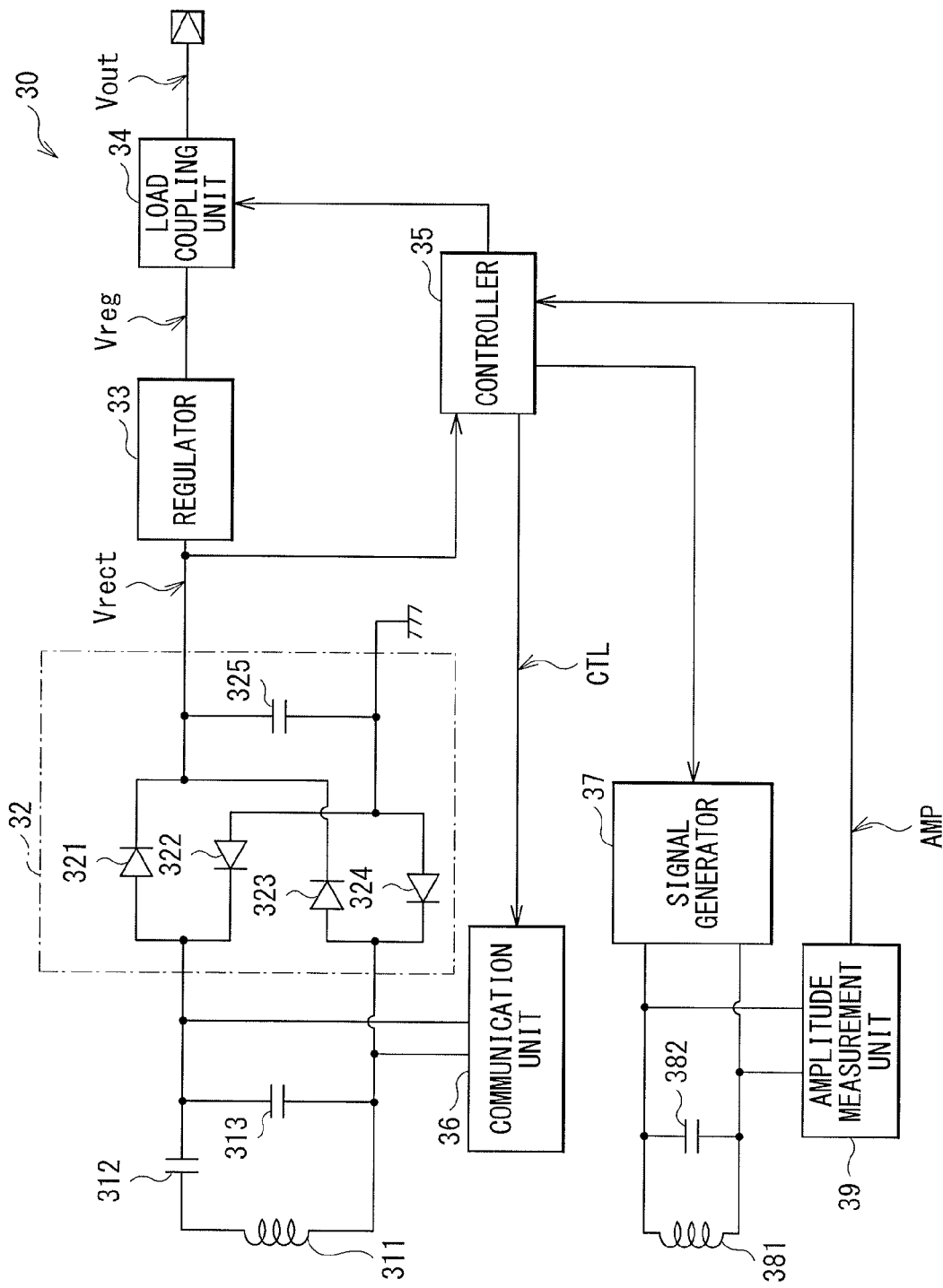
[FIG. 4]

[ FIG. 5 ]
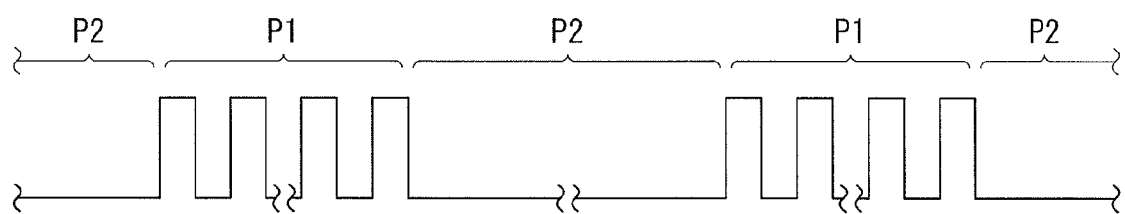
[ FIG. 6 ]
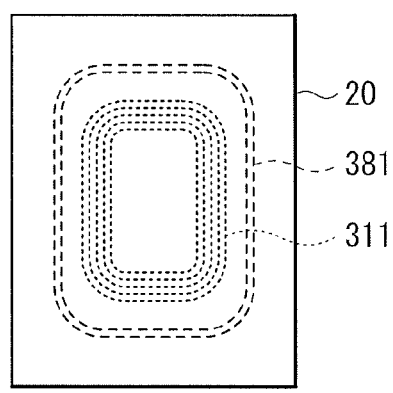

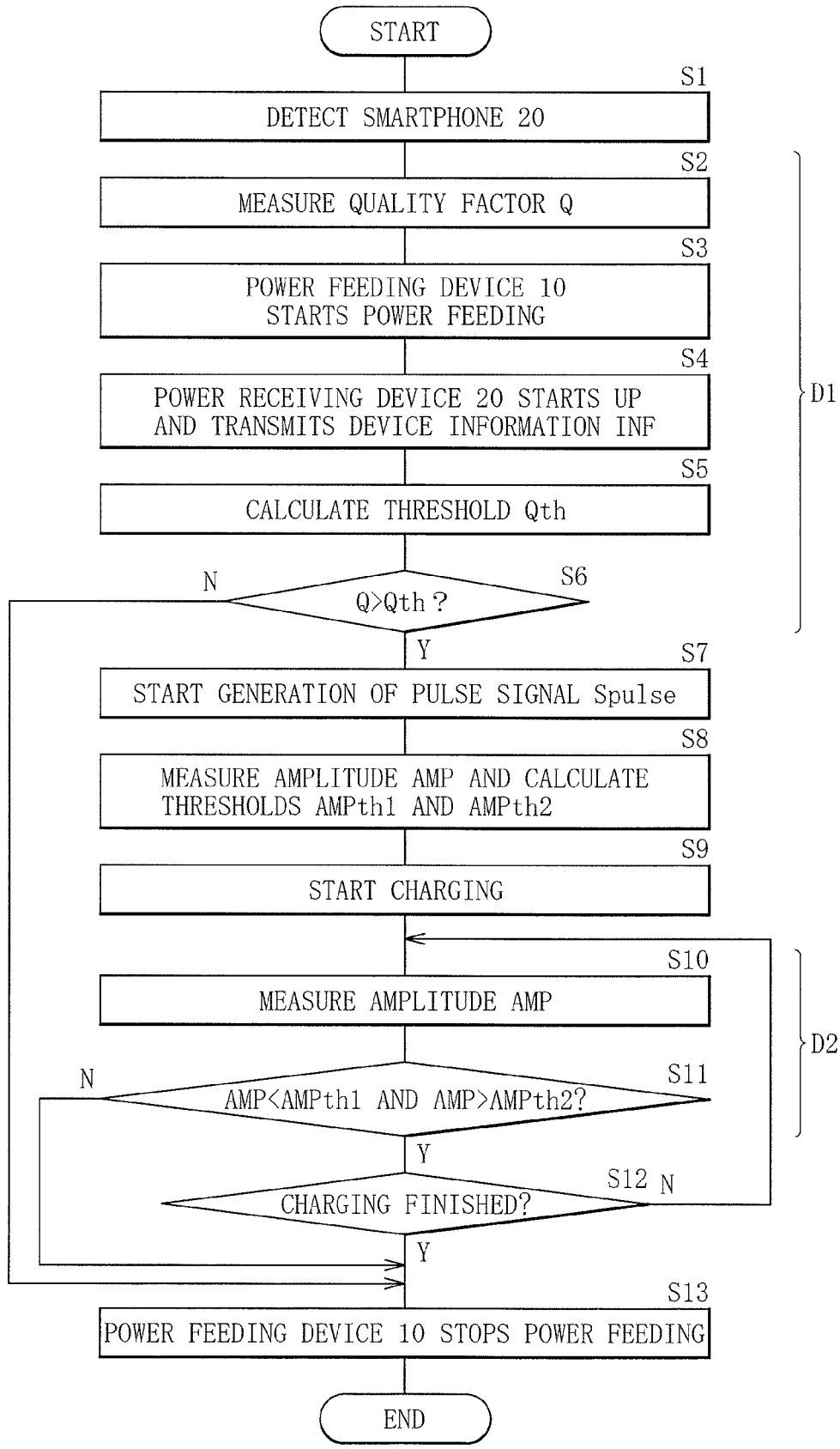

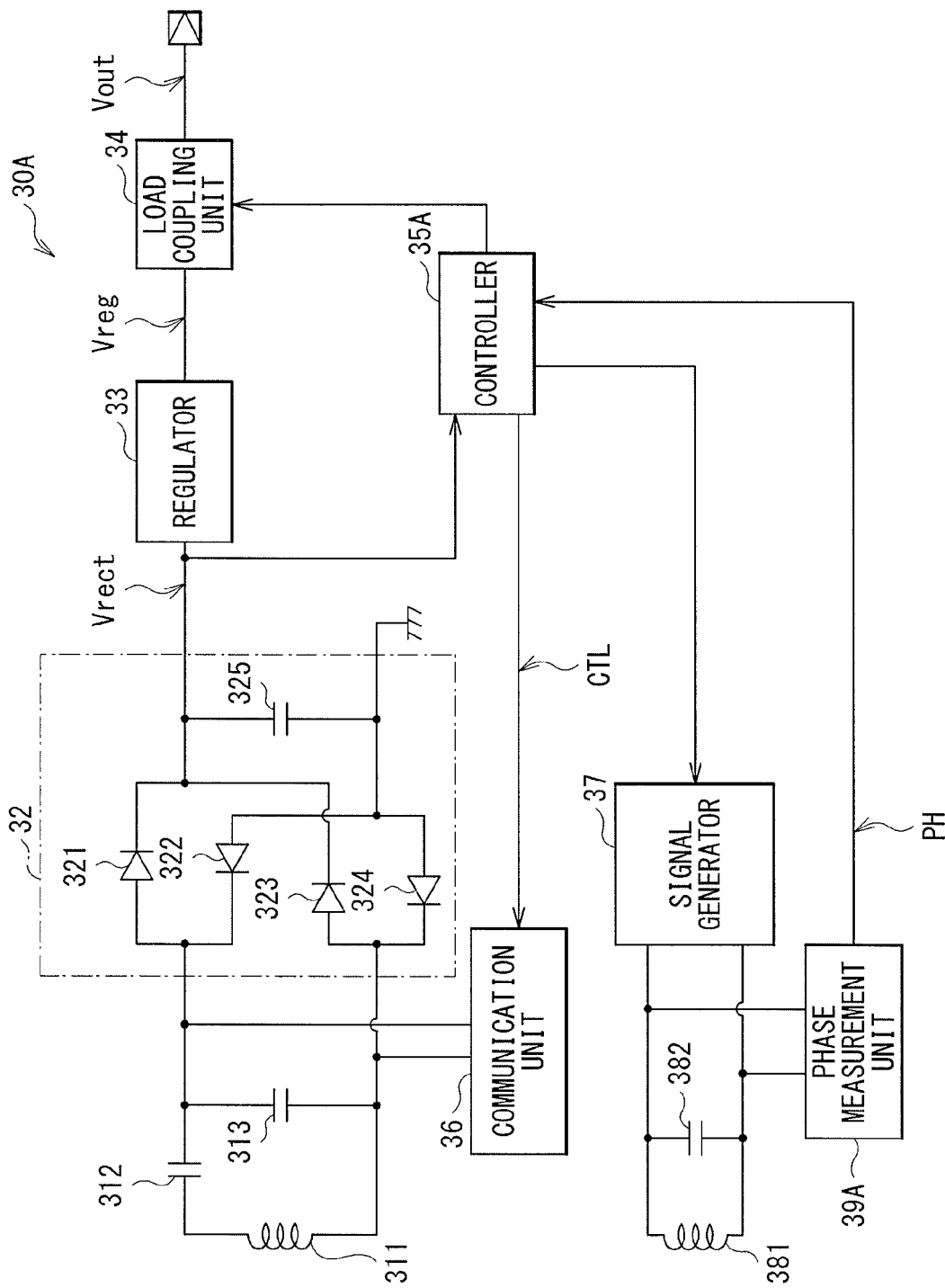
[FIG.8]

[FIG. 9]
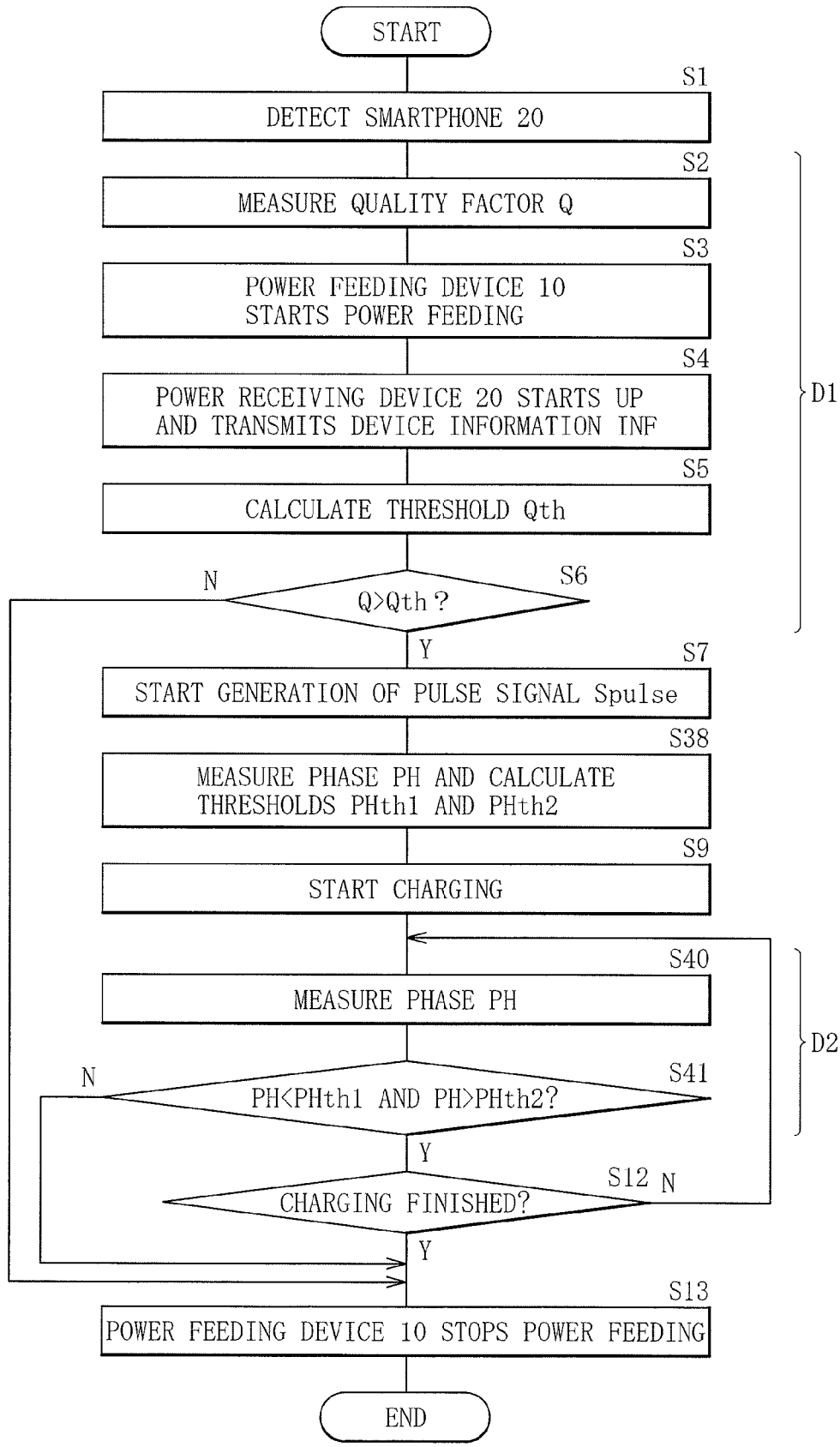

[ FIG. 10 ]
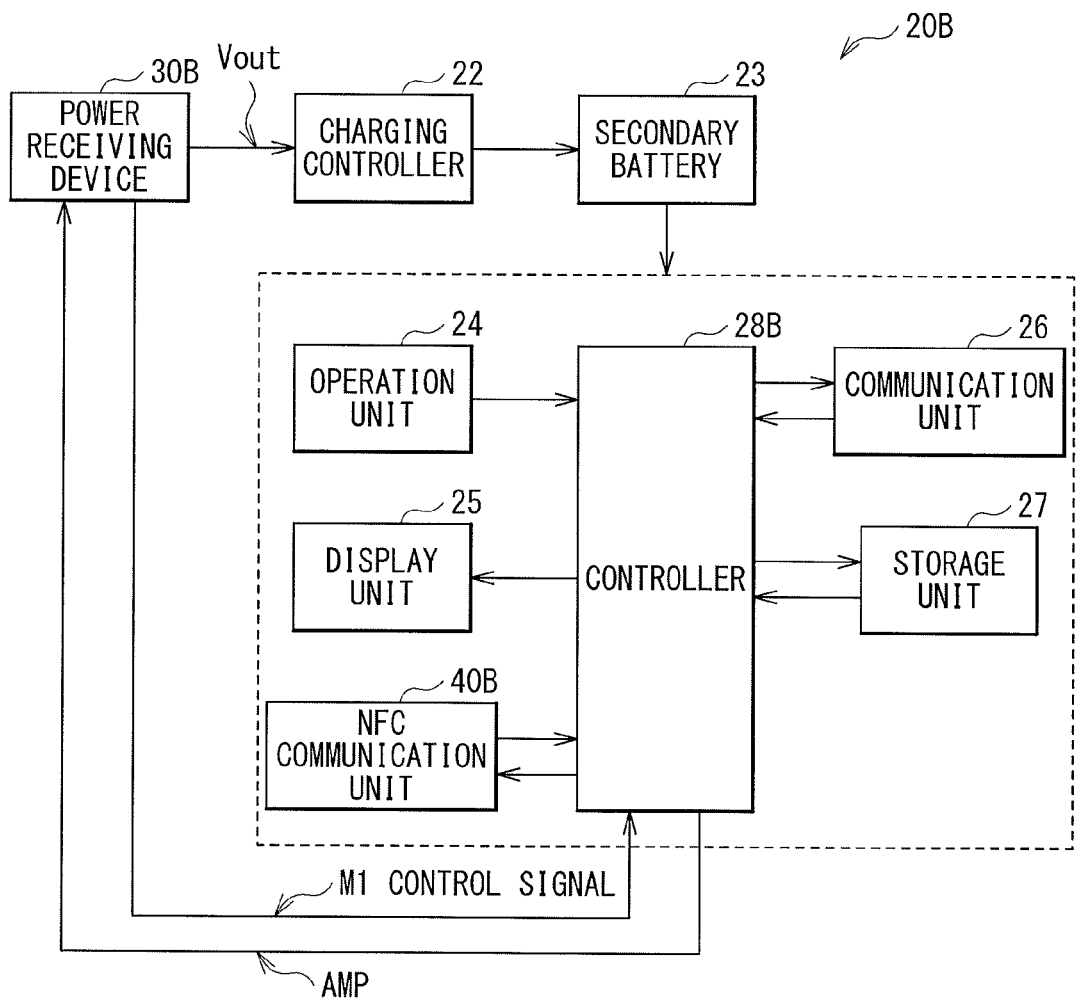
[ FIG. 11 ]
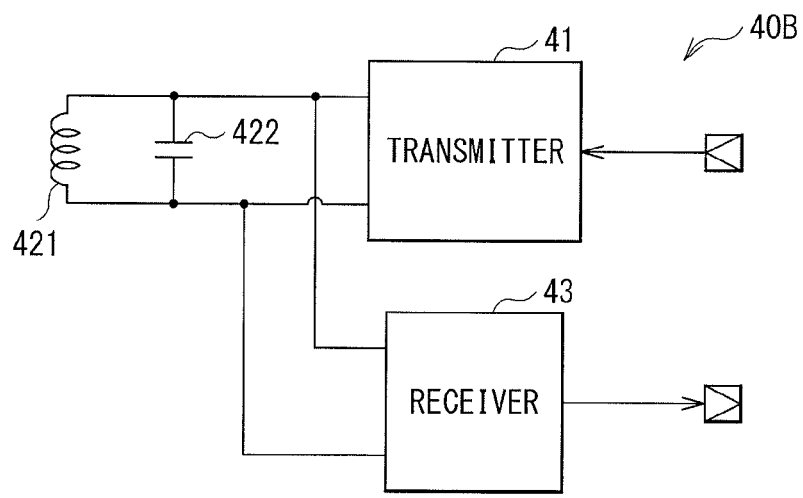

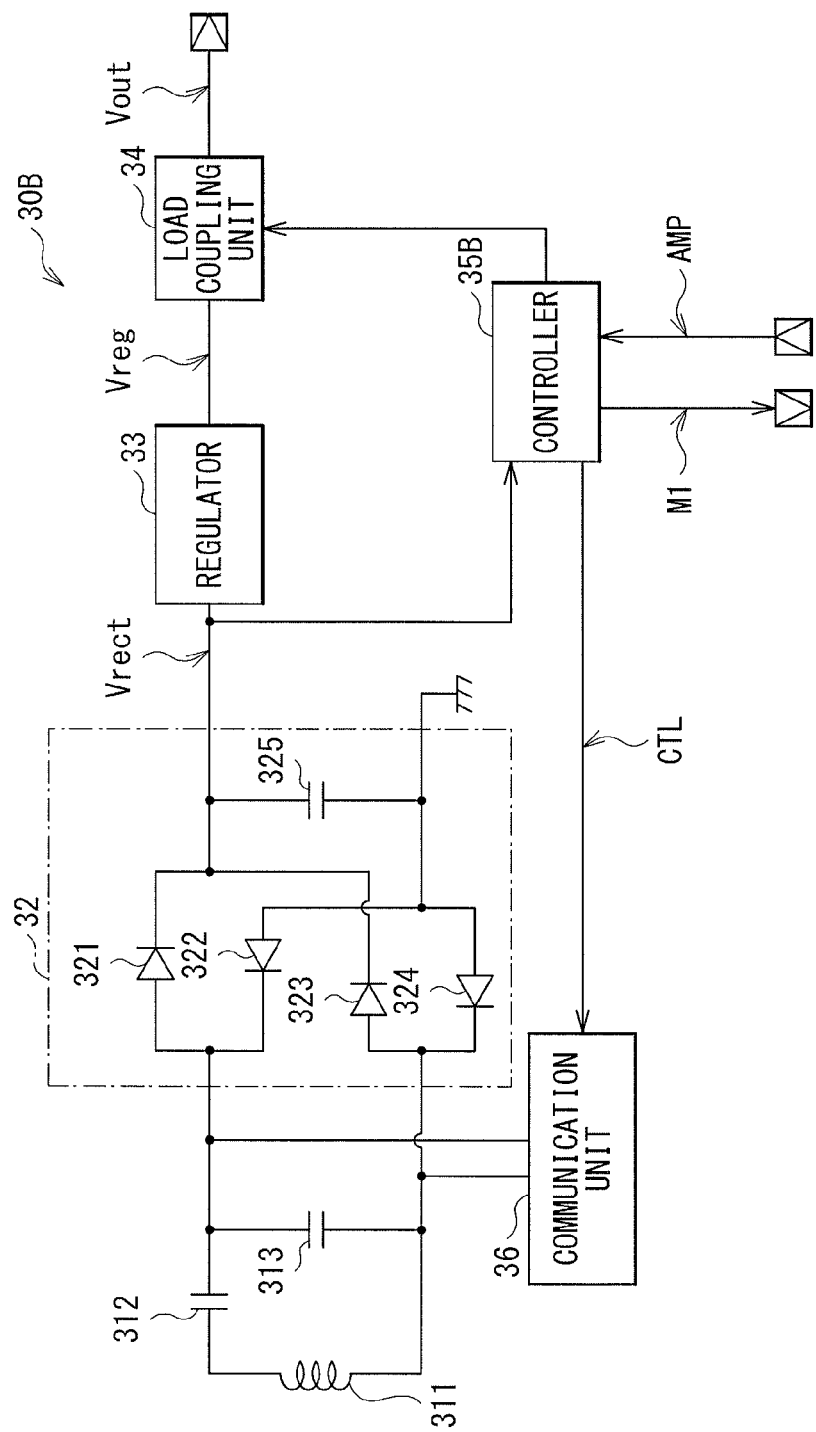
[FIG. 12]

[ FIG. 13 ]
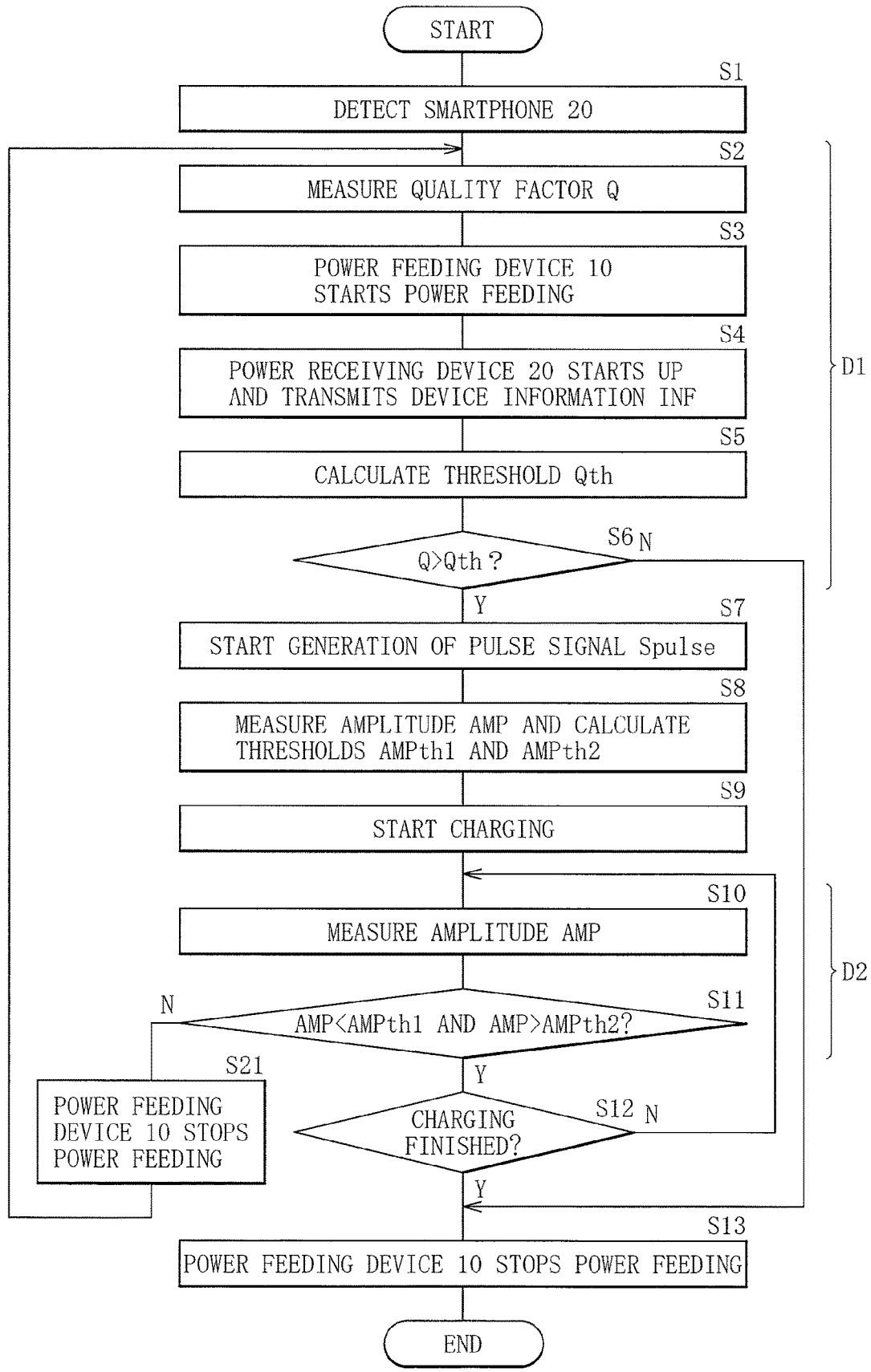

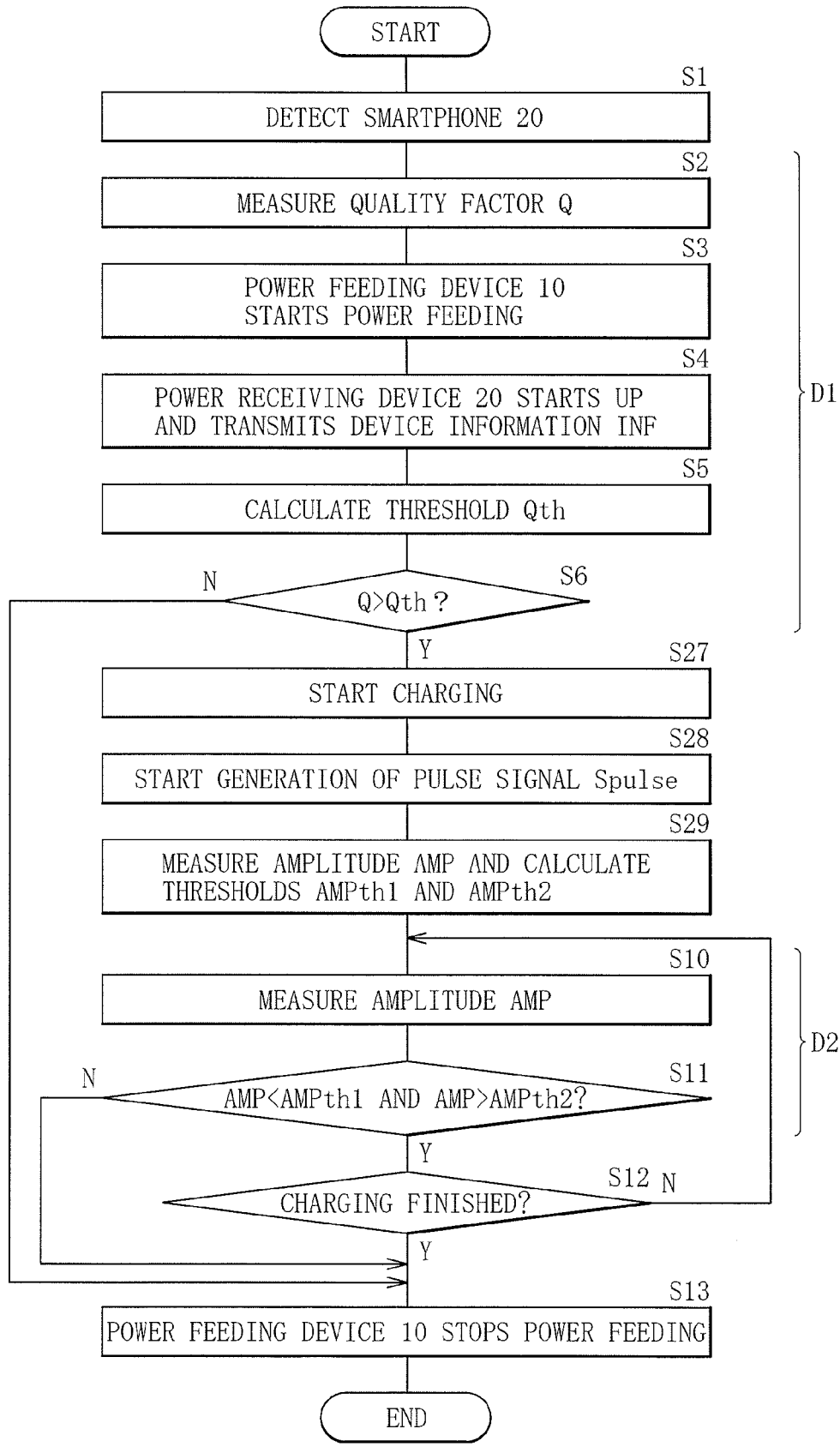
[ FIG. 14 ]

[ FIG. 15 ]
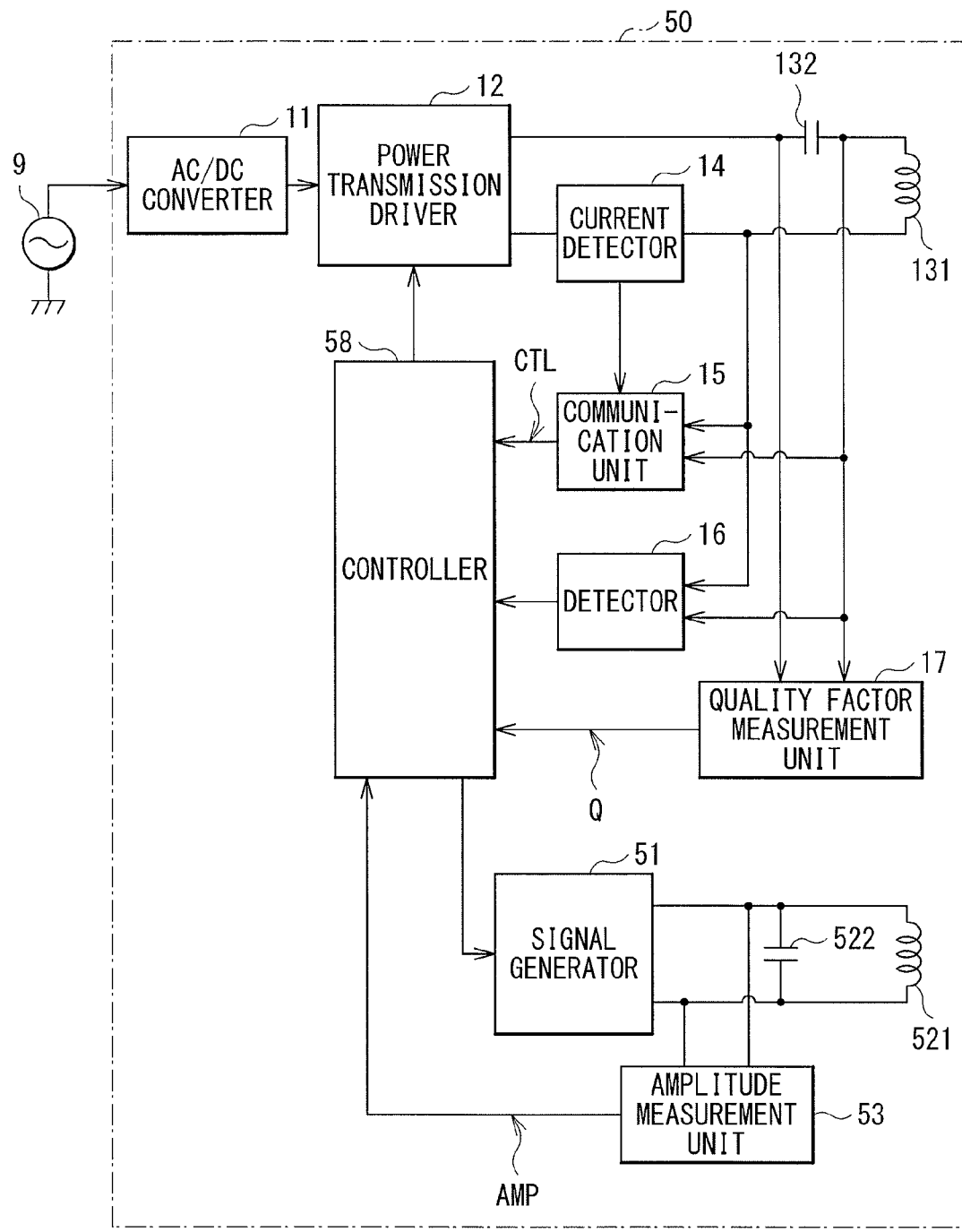

[ FIG. 16 ]
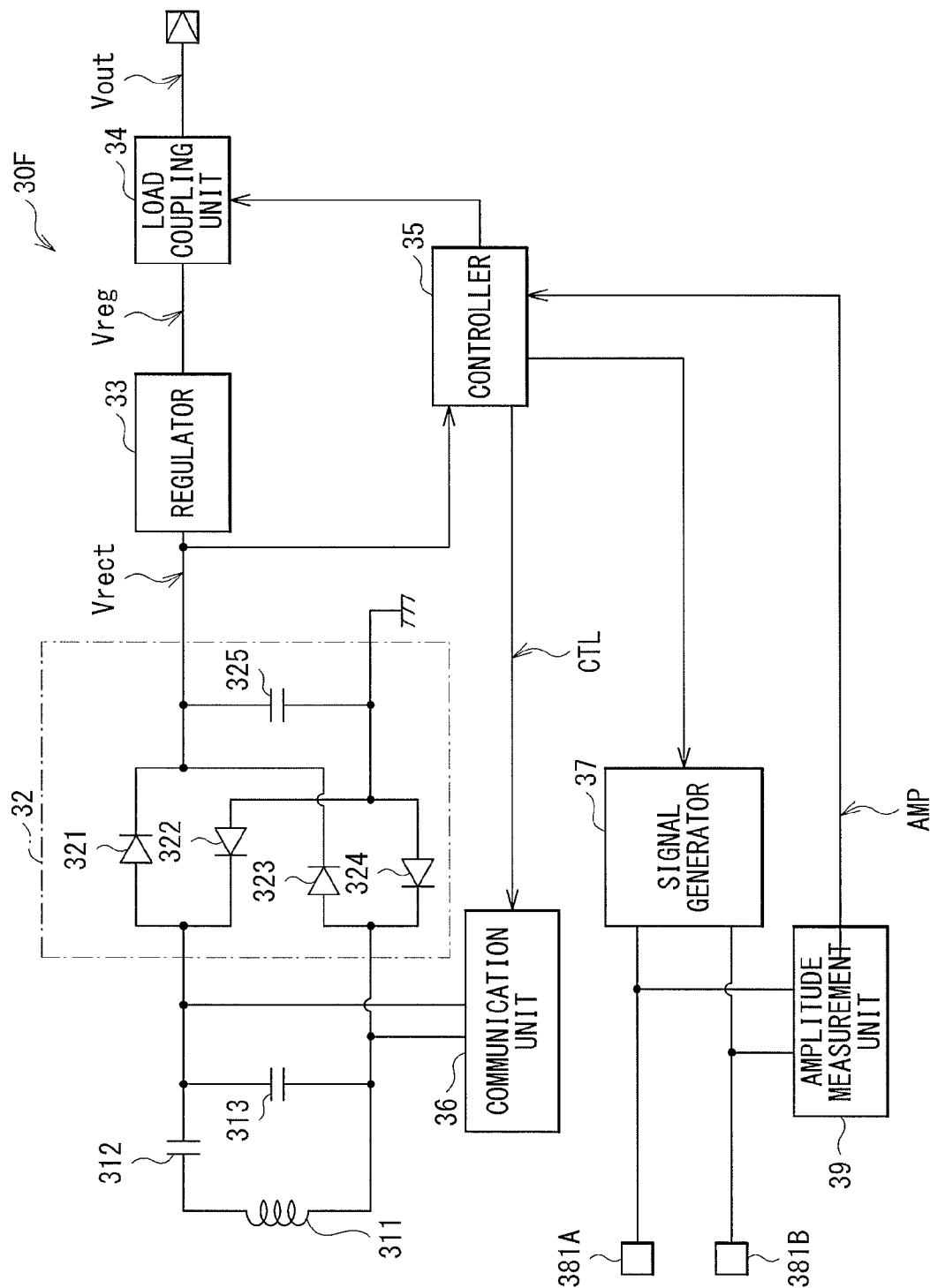

[ FIG. 17 ]
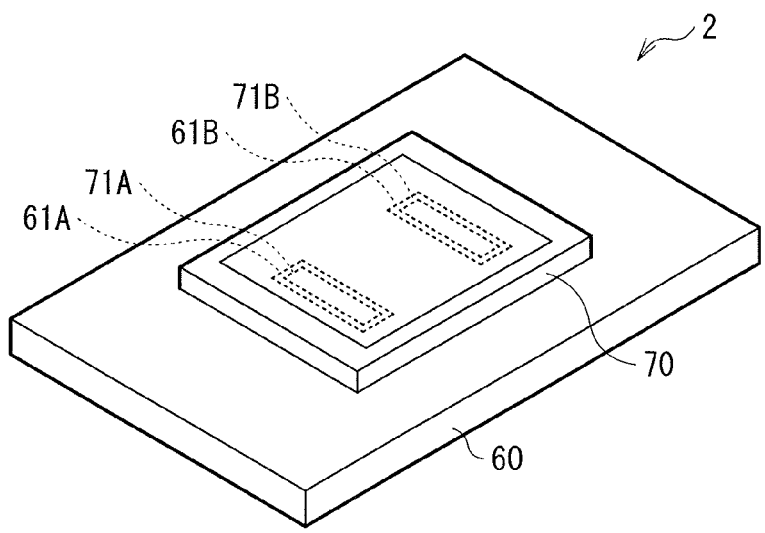
[ FIG. 18 ]
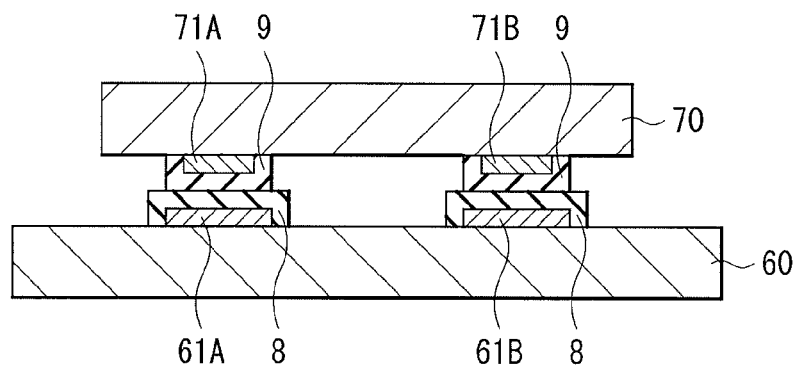

[ FIG. 19 ]
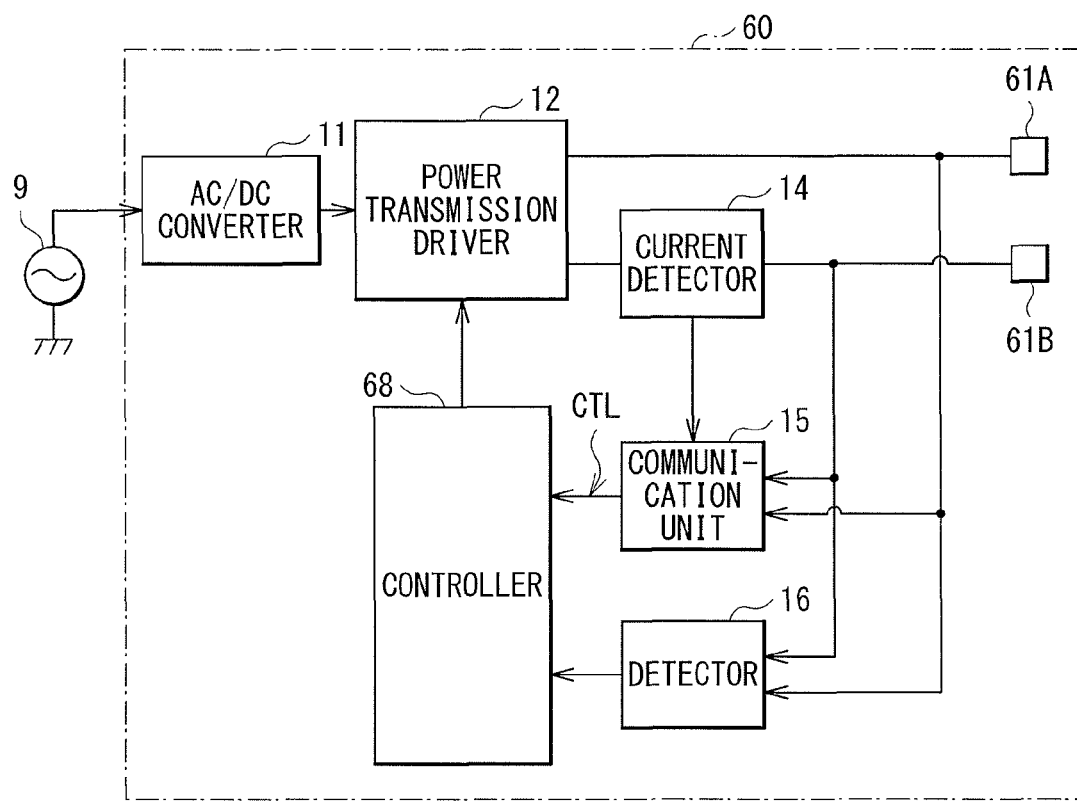

[FIG. 20]
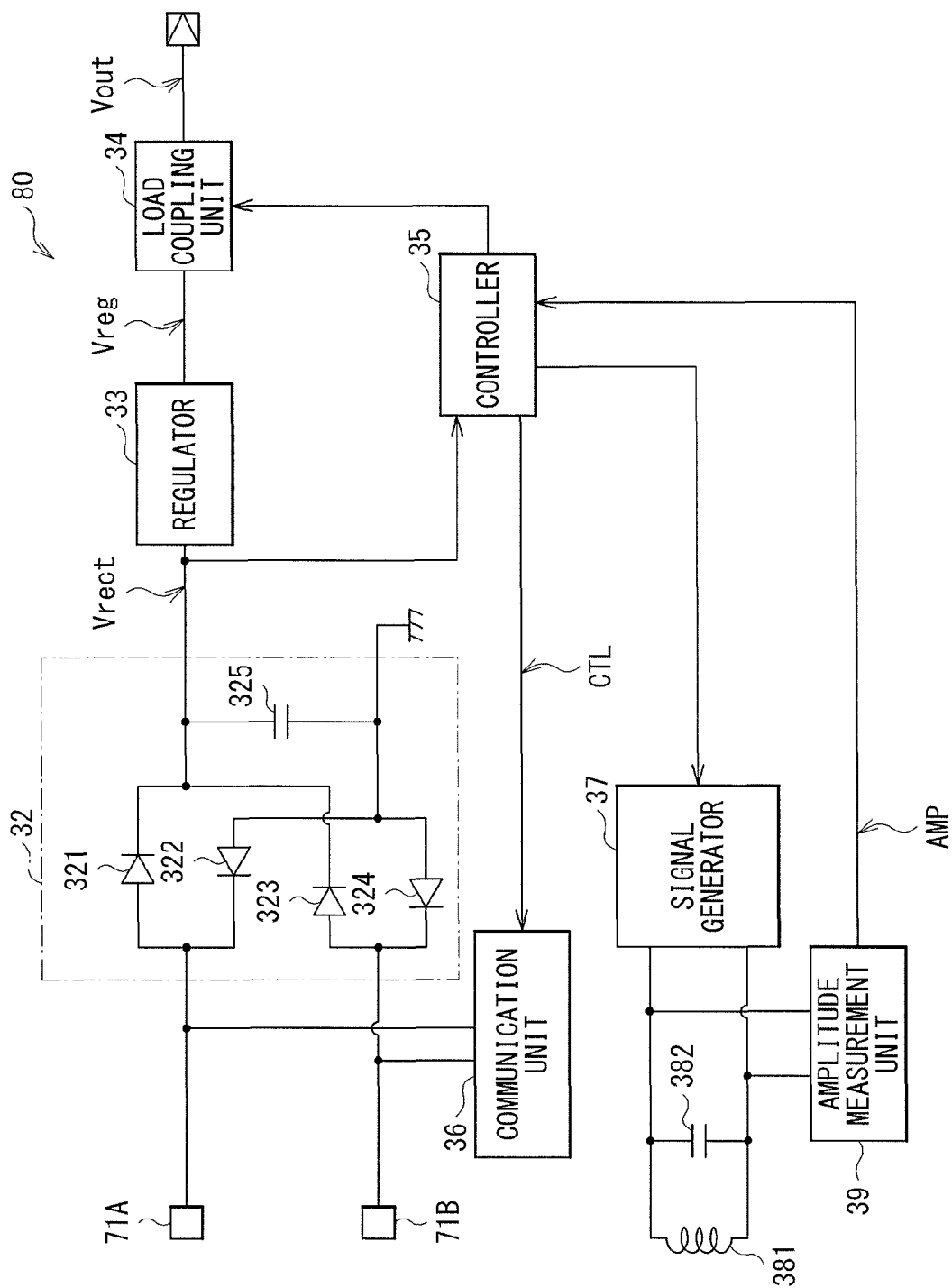

ND ELECTRONIC APPARATUS

POWER RECEIVING DEVICE, POWER FEEDING DEVICE, AND ELECTRONIC APPARATUS

TECHNICAL FIELD

The disclosure relates to a power receiving device that receives electric power in a wireless manner from a power feeding device, a power feeding device that supplies electric power in a wireless manner to a power receiving device, and an electronic apparatus including a power receiving device that receives electric power in a wireless manner from a power feeding device.

BACKGROUND ART

In recent years, attention has been drawn to power feeding systems that perform wireless power feeding (also referred to as wireless power transfer, contact free, or non-contact power feeding) to, for example a portable phone, a portable music player, and other CE (consumer electronics) devices. In such a power feeding system, for example, placing the portable phone (a power receiving device) on a power feeding tray (a power feeding device) allows for charging of the portable phone. Examples of methods of performing such wireless power feeding may include an electromagnetic induction method, a magnetic field resonance method (also referred to as a magnetic resonance method) using a resonance phenomenon, and a magnetic field coupling method.

In the power feeding system, in power feeding, presence of a foreign matter such as a metal piece between, for example, the power feeding device and the power receiving device may lead to possibility of heat generation and lowered safety. Accordingly, there has been a request for detecting the foreign matter and controlling power feeding operation. To detect the foreign matter, various methods have been disclosed. As one example, PTL 1 discloses a power feeding system that detects a foreign matter, in power feeding, on the basis of a difference between feeding power and received power. As another example, PTL 2 discloses a power feeding system that makes detection of a foreign matter before power feeding, and also makes detection of the foreign matter, in the power feeding, in a different way from that of the detection of the foreign matter before the power feeding.

CITATION LIST

Patent Literature

[PTL 1] Japanese Unexamined Patent Application Publication No. 2011-30422
[PTL 2] Japanese Unexamined Patent Application Publication No. 2014-7838

SUMMARY OF THE INVENTION

As described above, in the power feeding system, it is desired to enhance safety by detecting the foreign matter, with expectation of further improvement in completeness.

It is therefore desirable to provide a power receiving device, a power feeding device, and an electronic apparatus that make it possible to provide enhanced safety.

A power receiving device according to an embodiment of the disclosure includes a power generator, a detector, and a controller. The power generator includes a power receiving element that receives a power signal supplied in a wireless manner from a power feeding device. The power generator generates direct current power on the basis of the power signal. The detector includes a detection element. The detector drives the detection element and detects an alternating current signal generated in the detection element, during a power receiving period in which the power receiving element receives the power signal. The controller controls the power feeding device on the basis of a detection result of the detector.

A power feeding device according to an embodiment of the disclosure includes a power feeder, a detector, and a controller. The power feeder includes a power feeding element, and generates a power signal to be supplied in a wireless manner to a power receiving device and outputs the power signal through the power feeding element. The detector includes a detection element. The detector drives the detection element and detects an alternating current signal generated in the detection element, during a power feeding period in which the power feeding element outputs the power signal. The controller controls the power feeder on the basis of a detection result of the detector.

An electronic apparatus according to an embodiment of the disclosure includes a power receiving device and a communication unit. The communication unit includes a communication coil and performs communication with an external apparatus by using the communication coil. The power receiving device includes a power generator and a controller. The power generator includes a power receiving element that receives a power signal supplied in a wireless manner from a power feeding device. The power generator generates direct current power on the basis of the power signal. The controller controls the communication unit to drive the communication coil and to make detection of an alternating current signal generated in the communication coil, during a power receiving period in which the power receiving element receives the power signal. The controller controls the power feeding device on the basis of a result of the detection.

In the power receiving device in the embodiment of the disclosure, the direct current power is generated on the basis of the power signal. On this occasion, the detection element is driven, and the alternating current signal generated in the detection element is detected, during the power receiving period in which the power receiving element receives the power signal. The power feeding device is controlled on the basis of the detection result.

In the power feeding device in the embodiment of the disclosure, the power signal is generated and outputted through the power feeding element. On this occasion, the detection element is driven, and the alternating current signal generated in the detection element is detected, during the power feeding period in which the power feeding element outputs the power signal. The power feeder is controlled on the basis of the detection result.

In the electronic apparatus in the embodiment of the disclosure, the direct current power is generated on the basis of the power signal. On this occasion, the communication coil is driven, and the detection of the alternating current signal generated in the communication coil is made, during the power receiving period in which the power receiving element receives the power signal. The power feeding device is controlled on the basis of the result of the detection.

According to the power receiving device in the embodiment of the disclosure, the detection element is provided. The detector drives the detection element and detects the alternating current signal generated in the detection element, during the power receiving period. The controller controls the power feeding device on the basis of the detection result. Hence, it is possible to provide enhanced safety.

According to the power feeding device in the embodiment of the disclosure, the detection element is provided. The detector drives the detection element and detects the alternating current signal generated in the detection element, during the power feeding period. The controller controls the power feeder on the basis of the detection result. Hence, it is possible to provide enhanced safety.

According to the electronic apparatus in the embodiment of the disclosure, the communication unit drives the communication coil and makes the detection of the alternating current signal generated in the communication coil, during the power receiving period. The controller controls the power feeding device on the basis of the result of the detection. Hence, it is possible to provide enhanced safety.

It is to be noted that effects of the embodiments of the technology are not necessarily limited to the effects described above, and may include any of effects that are described in the disclosure.

BRIEF DESCRIPTION OF DRAWING

FIG. 1 is a perspective view of an exemplary configuration of a power feeding system according to an embodiment of the disclosure.

FIG. 2 is a block diagram of an exemplary configuration of a power feeding device illustrated in FIG. 1.

FIG. 3 is a block diagram of an exemplary configuration of a smartphone illustrated in FIG. 1.

FIG. 4 is a block diagram of an exemplary configuration of a power receiving device illustrated in FIG. 3.

FIG. 5 is a waveform chart of an example of a pulse signal.

FIG. 6 is a schematic view of an exemplary configuration of a power receiving coil and a detection coil.

FIG. 7 is a flowchart of exemplary operation of the power feeding system illustrated in FIG. 1.

FIG. 8 is a block diagram of an exemplary configuration of a power receiving device according to a modification.

FIG. 9 is a flowchart of exemplary operation of a power feeding system including the power receiving device illustrated in FIG. 8.

FIG. 10 is a block diagram of an exemplary configuration of a smartphone according to another modification.

FIG. 11 is a block diagram of an exemplary configuration of an NFC communication unit illustrated in FIG. 10.

FIG. 12 is a block diagram of an exemplary configuration of a power receiving device illustrated in FIG. 10.

FIG. 13 is a flowchart of exemplary operation of a power feeding system according to another modification.

FIG. 14 is a flowchart of exemplary operation of a power feeding system according to another modification.

FIG. 15 is a block diagram of an exemplary configuration of a power feeding device according to another modification.

FIG. 16 is a block diagram of an exemplary configuration of a power receiving device according to another modification.

FIG. 17 is a perspective view of an exemplary configuration of a power feeding system according to another modification.

FIG. 18 is a cross-sectional view of a schematic cross-sectional structure of the power feeding system illustrated in FIG. 17.

FIG. 19 is a block diagram of an exemplary configuration of a power feeding device illustrated in FIG. 17.

FIG. 20 is a block diagram of an exemplary configuration of a power receiving device in a smartphone illustrated in FIG. 17.

MODES FOR CARRYING OUT THE INVENTION

In the following, some embodiments of the disclosure are described in detail with reference to the drawings.
[Embodiment]
[Exemplary Configuration]

FIG. 1 illustrates an exemplary configuration of a power feeding system that includes a power receiving device according to an embodiment. A power feeding system 1 may make detection of a foreign matter before power feeding, and also make detection of the foreign matter in the power feeding in a different way from that of the detection of the foreign matter before the power feeding. It is to be noted that since an electronic apparatus according to an embodiment of the disclosure is embodied by this embodiment, description thereof is made together.

The power feeding system 1 may include a power feeding device 10 and a smartphone 20. In this example, the power feeding device 10 may be a tray type of power feeding device. Placing the smartphone 20 on a power feeding surface of the power feeding device 10 allows for the power feeding to a power receiving device 30 (described later) incorporated in the smartphone 20, and charging of a secondary battery 23 (described later).

A power feeding coil 131 (described later) may be disposed in the power feeding surface of the power feeding device 10 (on side on which contact with the smartphone 20 is made). A power receiving coil 311 (described later) may be disposed in a power receiving surface of the smartphone 20 (on side on which contact with the power feeding device 10 is made). The power feeding device 10 may supply electric power to the smartphone 20 through the power feeding coil 131 and the power receiving coil 311 by virtue of electromagnetic induction. This enables a user to charge the secondary battery 23 without having to directly couple an AC (alternating current) adaptor or other connection tool to the smartphone 20, thereby providing the user with good usability.

Moreover, as described later, the power feeding device 10 may also have a function of making detection (foreign-matter detection D1) of presence or absence of any foreign matter such as a metal piece between the power feeding device 10 and the smartphone 20, before the power feeding, with use of the power feeding coil 131.

In addition, as described later, besides the power receiving coil 311, a detection coil 411 (described later) may be disposed in the power receiving surface of the smartphone 20. The power receiving device 30 in the smartphone 20 may make detection (foreign-matter detection D2) of presence or absence of any foreign matter between the power feeding device 10 and the smartphone 20 (the power receiving device 30), in the power feeding, with use of the detection coil 411.

As described, the power feeding system 1 may make the foreign-matter detection D1 before the power feeding and also make the foreign-matter detection D2 in the power feeding. More specifically, the power feeding system 1 may check the absence of the foreign matter through the foreign-matter detection D1, and thereafter, start the charging of the secondary battery 23 (described later). The power feeding system 1 may stop the charging if any foreign matter is detected afterward through the foreign-matter detection D2.

Hence, in the power feeding system 1, it is possible to perform the power feeding with enhanced safety, as compared to a case in which, for example, only the foreign matter-detection D1 before the power feeding is made.

It is to be noted that this example involves performing the power feeding to the smartphone 20, but this is non-limiting. Alternatively, for example, the power feeding may be performed to various electronic apparatuses such as a video camera, a smartphone, a mobile battery, a tablet, an electronic book reader, and an audio player. Moreover, in this example, the power feeding device 10 performs the power feeding to the single smartphone 20. However, this is non-limiting. Alternatively, for example, the power feeding may be performed to two or more electronic apparatuses in a simultaneous or time-divisional (sequential) manner.

FIG. 2 illustrates an exemplary configuration of the power feeding device 10. The power feeding device 10 may include an AC/DC converter 11, a power transmission driver 12, the power feeding coil 131, a capacitative element 132, a current detector 14, a communication unit 15, a detector 16, a quality factor measurement unit 17, and a controller 18.

The AC/DC converter 11 may convert an alternating current power signal supplied from an AC power supply 9 into a direct current power signal, and supply the direct current power signal to the power transmission driver 12. It is to be noted that in this example, the alternating current power signal is supplied to the power feeding device 10, but this is non-limiting. Alternatively, for example, a direct current power signal may be supplied. In this case, for example, the AC/DC converter 11 may be omitted.

The power transmission driver 12 may generate an alternating current signal Sac1 or Sac2 and an alternating current power signal Sp1 on the basis of the direct current power signal supplied from the AC/DC converter 11. The power transmission driver 12 may output the alternating current signal Sac1 or Sac2 and the alternating current power signal Sp1 as an interterminal signal of a first output terminal and a second output terminal. More specifically, the power transmission driver 12 may generate the signal Sac1, in detecting whether any object is placed on the power feeding device 10 on the basis of an instruction from the controller 18. The power transmission driver 12 may generate the signal Sac1, in making the foreign-matter detection D1 before the power feeding. The power transmission driver 12 may generate the power signal Sp1, in performing the power feeding to the power receiving device 30. Details of the operation are described later. Here, electric power of the signal Sac1 or Sac2 may be lower than electric power of the power signal Sp1. Moreover, the power transmission driver 12 may change a power feeding frequency fp of the power signal Sp1, on the basis of an instruction from the controller 18, in performing the power feeding to the power receiving device 30. It is to be noted that this is non-limiting. Alternatively, for example, the power transmission driver 12 may change amplitude, a duty ratio, or other parameters of the power signal Sp1 on the basis of the instruction from the controller 18.

The power feeding coil 131 may be disposed in the power feeding surface of the power feeding device 10. The power feeding coil 131 may include one end coupled to the first output terminal of the power transmission driver 12 through the capacitative element 132 and another end coupled to the second output terminal of the power transmission driver 12 through the current detector 14. Thus, the power feeding coil 131 and the capacitative element 132 may be coupled in series, and constitute an LC resonant circuit. The signal Sac1 or Sac2 and the power signal Sp1 may be supplied, from the power transmission driver 12, to across both ends of the power feeding coil 131 and the capacitative element 132 that are coupled in series. Accordingly, the power feeding coil 131 may generate an electromagnetic field in accordance with the signal Sac1 or Sac2 and the power signal Sp1.

The current detector 14 may detect a current flowing through the power feeding coil 131. The current detector 14 may include one end coupled to, for example, the other end of the power feeding coil 131 and another end coupled to the second output terminal of the power transmission driver 12.

The communication unit 15 may perform communication with the power receiving device 30 (described later) in the smartphone 20 and receive a power feeding control signal CTL. The power feeding control signal CTL may contain information involved in power feeding operation. Examples of the information may include a request for an increase in feeding power and a request for a decrease in the feeding power, to the power feeding device 10. Moreover, in this example, the power feeding control signal CTL may further contain device information INF regarding a quantity and/or layout of a conductor contained in the smartphone 20, as described later. The communication unit 15 may acquire the power feeding control signal CTL on the basis of a voltage across the ends of the power feeding coil 131 and the current detected by the current detector 14. More specifically, first, the power feeding device 10 may perform the power feeding to the smartphone 20. During a power feeding period, a communication unit 36 (described later) in the power receiving device 30 may change a load as observed from the power feeding device 10 in accordance with a signal to be transmitted (the power feeding control signal CTL). This change in the load may appear, in the power feeding device 10, as a change in amplitude or a phase of the voltage across the ends of the power feeding coil 131 and a change in amplitude or a phase of the current flowing through the power feeding coil 131. The communication unit 15 may detect the changes in the amplitude or the phases of the voltage and the current, thereby acquiring the power feeding control signal CTL transmitted from the power receiving device 30. In this way, the power feeding system 1 may perform communication by virtue of so-called load modulation.

It is to be noted that in this example, the communication unit 15 receives the power feeding control signal CTL, but this is non-limiting. Alternatively, for example, the communication unit 15 may receive a signal independent of the power feeding operation, in addition to the power feeding control signal CTL. Furthermore, the communication unit 15 may have a function of transmitting a signal to the power receiving device 30.

The detector 16 may detect whether an object (e.g., the smartphone 20) is placed on the power feeding device 10, on the basis of the voltage across the ends of the power feeding coil 131. More specifically, first, the detector 16 may detect a signal across the ends of the power feeding coil 131, during a period in which the transmission driver 12 generates the signal Sac1. On this occasion, a signal that corresponds to the signal Sac1 may emerge across the ends of the power feeding coil 131. Amplitude or a phase of this signal may change depending on whether the object is placed on the power feeding device 10. The detector 16 may detect the change in the amplitude or the phase, thereby detecting presence or absence of the object. Moreover, the detector 16 may supply a detection result to the controller 18. It is to be noted that a method of detecting the object is not limiting. Various methods may be applicable that allow for detection of the presence or the absence of the object.

The quality factor measurement unit 17 may determine a quality factor Q, on the basis of voltages at the respective ends of the capacitative element 132, during the foreign-matter detection D1. The quality factor Q may be related to a quality factor of the LC resonant circuit in the power feeding device 10. In other words, the quality factor Q may be related to efficiency of the power feeding from the power feeding device 10 to the power receiving device 30. The presence of the foreign matter such as the metal piece between the power feeding device 10 and the smartphone 20 may cause a decrease in the quality factor Q due to a resistance component of the foreign matter. Thus, the power feeding device 10 may detect the presence or the absence of the foreign matter on the basis of the quality factor Q.

More specifically, the quality factor measurement unit 17 may determine voltage amplitude V1 and voltage amplitude V2, during a period in which the power transmission driver 12 generates the alternating current signal Sac2. The voltage amplitude V1 denotes amplitude of a voltage at one node of both nodes of the capacitative element 132 on side on which the power transmission driver 12 is disposed. The voltage amplitude V2 denotes amplitude of a voltage at another node of both nodes of the capacitative element 132 on side on which the power feeding coil 131 is disposed. Moreover, the quality factor measurement unit 17 may determine the quality factor Q from the following expression, $$Q = V2/V1.$$

Further, the quality factor measurement unit 17 may supply the quality factor Q determined in this manner to the controller 18.

The controller 18 may control the transmission driver 12, thereby controlling the power feeding operation to the power receiving device 30.

More specifically, in detecting whether the object (for example, the smartphone 20) is placed on the power feeding device 10, the controller 18 may control the power transmission driver 12 to generate the signal Sac1 and receive the detection result from the detector 16. Moreover, the controller 18 may control the transmission driver 12 on the basis of the detection result.

Moreover, in making the foreign-matter detection D1, the controller 18 may control the power transmission driver 12 to generate the signal Sac2 and acquire the quality factor Q from the quality factor measurement unit 17. Further, the controller 18 may receive the device information INF through the power feeding control signal CTL from the communication unit 15 and generate a threshold Qth on the basis of the device information INF. After that, the controller 18 may compare the measured quality factor Q with the threshold Qth and control the transmission driver 12 on the basis of a comparison result.

Furthermore, in the power feeding to the power receiving device 30, the controller 18 may receive, from the communication unit 15, the request for the increase or the decrease in the feeding power, through the power feeding control signal CTL. The controller 18 may control, on the basis of the received request, the power feeding frequency fp of the power signal Sp1 generated by the power transmission driver 12. In this way, the power feeding system 1 may change the efficiency of the power feeding from the power feeding device 10 to the power receiving device 30, thereby regulating the feeding power.

FIG. 3 illustrates an exemplary configuration of the smartphone 20. The smartphone 20 may include the power receiving device 30, a charging controller 22, the secondary battery 23, an operation unit 24, a display unit 25, a communication unit 26, a storage unit 27, and a controller 28. The power receiving device 30 may receive the electric power supplied from the power feeding device 10 to generate an output voltage Vout and supply the output voltage Vout to the charging controller 22. In other words, the charging controller 22 and subsequent blocks may serve as a load on the power receiving device 30.

FIG. 4 illustrates an exemplary configuration of the power receiving device 30. The power receiving device 30 may include the power receiving coil 311, capacitative elements 312 and 313, a rectification circuit 32, a regulator 33, a load coupling unit 34, the communication unit 36, a signal generator 37, the detection coil 381, a capacitative element 382, an amplitude measurement unit 39, and a controller 35.

The power receiving coil 311 may be disposed in the power receiving surface of the smartphone 20. The power receiving coil 311 may include one end coupled to a first input terminal of the rectification circuit 32 through the capacitative element 312 and another end coupled to a second input terminal of the rectification circuit 32. Moreover, the capacitative element 313 may be interposed between the first input terminal and the second input terminal of the rectification circuit 32. Thus, the power receiving coil 311 and the capacitative element 312 may be coupled in series, and constitute an LC resonant circuit. Further, the power receiving coil 311 may generate, on the basis of an electromagnetic field generated by the power feeding coil 131 in the power feeding device 10, an induced voltage corresponding to a change in a magnetic flux of the electromagnetic field, in accordance with the law of electromagnetic induction.

In the power feeding, a circuit formed by the power receiving coil 311 and the capacitative elements 312 and 313 may generate an alternating current power signal Sp2 having a voltage corresponding to the induced voltage generated across the ends of the power receiving coil 311, and supply the alternating current power signal Sp2 to the rectification circuit 32. In short, the power signal Sp2 may be generated on the basis of the power signal Sp1 in the power feeding device 10.

The rectification circuit 32 may be a bridge full-wave rectifying circuit in this example, and rectify the alternating current power signal Sp2 to generate a direct current signal (a receiving voltage Vrect). The rectification circuit 32 may include diodes 321 to 324 and a capacitative element 325. The diode 321 may include an anode coupled to the first input terminal of the rectification circuit 32 and a cathode coupled to a first output terminal of the rectification circuit 32. The diode 322 may include an anode coupled to a second output terminal of the rectification circuit 32 and a cathode coupled to the first input terminal of the rectification circuit 32. The diode 323 may include an anode coupled to the second input terminal of the rectification circuit 32 and a cathode coupled to the first output terminal of the rectification circuit 32. The diode 324 may include an anode coupled to the second output terminal of the rectification circuit 32 and a cathode coupled to the second input terminal of the rectification circuit 32. The capacitative element 325 may include one end coupled to the first output terminal of the rectification circuit 32 and another end coupled to the second output terminal of the rectification circuit 32. The second output terminal of the rectification circuit 32 may be grounded. With this configuration, the rectification circuit 32 may rectify and smooth the power signal Sp2 to generate the direct current signal (the receiving voltage Vrect). The rectification circuit 32 may output the direct current signal through the first output terminal thereof It is to be noted that in this example, the rectification circuit 32 is constituted with use of the diodes 321 to 324 and the capacitative element 325, but this is non-limiting. Various rectification circuits may be applicable.

The regulator 33 may generate direct current electric power having a voltage Vreg on the basis of the direct current signal supplied from the rectification circuit 32. Moreover, the regulator 33 may supply, as a power supply voltage, the voltage Vreg to each block in the power receiving device 30. In addition, the regulator 33 may also supply the voltage Vreg to the power receiving controller 22 and the subsequent blocks (the load), through the load coupling unit 34.

The load coupling unit 34 may form coupling of the regulator 33 to the load on the basis of an instruction from the controller 35. More specifically, upon receipt of the instruction to couple the regulator 33 to the load from the controller 35, the load coupling unit 34 may enter a coupling mode. This allows the power receiving device 30 to supply the direct current power to the load. Moreover, upon receipt of the instruction from the controller 35 to decouple the regulator 33 from the load, the load coupling unit 34 may enter a decoupling mode. This allows the power receiving device 30 to stop supplying the direct current power to the load.

The communication unit 36 may transmit the power feeding control signal CTL to the power feeding device 10. More specifically, the communication unit 36 may change impedance between the first input terminal and the second input terminal of the rectification circuit 32 in accordance with the power feeding control signal CTL during a period in which the power feeding device 10 performs the power feeding to the power receiving device 30. The communication unit 15 in the power feeding device 10 may detect the change in the impedance (a change in the load), thereby receiving the power feeding control signal CTL.

The signal generator 37 may generate a pulse signal Spulse, on the basis of an instruction from the controller 35, when the foreign-matter detection D2 is performed in the power feeding.

FIG. 5 illustrates an example of the pulse signal Spulse. The pulse signal Spulse may include pulse parts P1 and no-signal parts P2. The pulse part P1 may alternate between a high level and a low level. The pulse parts P1 and the no-signal parts P2 may alternately appear on a temporal axis. In this example, each pulse part P1 may have a length of about 300 [μsec]. A frequency of the signal in the pulse part P1 may be about 13.56 [MHz]. This frequency may differ from the frequency of the power signal Sp4. Moreover, in this example, each no-signal part P2 may have a length of about 300 [μsec]. It is to be noted that in this example, in the no-signal part P2, a voltage of the pulse signal Spulse may be set to the low level, but this is non-limiting. Alternatively, the voltage of the pulse signal Spulse in the no-signal part P2 may be set to the high level or any other voltage level, for example. Further, in the no-signal part P2, the signal generator 37 may output no signal.

The signal generator 37 may generate the pulse signal Spulse as described above, when the foreign-matter detection D2 is performed. Moreover, the signal generator 37 may output the pulse signal Spulse as an interterminal signal between the first output terminal and the second output terminal, thereby driving the detection coil 381 and other elements.

The detection coil 381 may be disposed in the power receiving surface of the smartphone 20. The detection coil 381 may include one end coupled to a first output terminal of the signal generator 37 and another end coupled to a second output terminal of the signal generator 37. The capacitative element 382 may be coupled in parallel to the detection coil 381. The detection coil 381 may generate an electromagnetic field in accordance with the pulse signal Spulse.

FIG. 6 schematically illustrates exemplary layout of the detection coil 381. In this example, the detection coil 381 may be disposed, in the power receiving surface of the smartphone 20, so as to surround the power receiving coil 311, with a larger radius than that of the power receiving coil 311. This makes it possible to reduce footprints of the power receiving coil 311 and the detection coil 381, in the smartphone 20. However, this is non-limiting. Alternatively, for example, the detection coil 381 may be disposed side by side with the power receiving coil 311.

The amplitude measurement unit 39 may measure amplitude AMP of a signal generated across the ends of the power feeding coil 381, when the foreign-matter detection D2 is performed. More specifically, the amplitude measurement unit 39 may measure the amplitude AMP of the signal generated across the ends of the power feeding coil 381, during a period in which the signal generator 37 generates each pulse part P1 of the pulse signal Spulse. On this occasion, a signal corresponding to each pulse part P1 of the pulse signal Spulse may appear across the ends of the power feeding coil 381. The amplitude AMP and a phase of this signal may change depending on the presence or the absence of the foreign matter between the power feeding device 10 and the smartphone 20. The amplitude measurement unit 39 may measure the amplitude AMP of the signal and supply the amplitude AMP to the controller 35.

The controller 35 may generate the power feeding control signal CTL, thereby controlling the power feeding operation of the power feeding system 1. More specifically, when the power feeding device 10 makes the foreign-matter detection D1, the controller 35 may generate the power feeding control signal CTL that indicates, for example, the device information INF regarding the quantity and/or the layout of the conductor contained in the smartphone 20. Moreover, in the power feeding, the controller 35 may generate, on the basis of the receiving voltage Vrect, the power feeding control signal CTL that indicates, for example, the request for the increase or the decrease in the feeding power.

Furthermore, the controller 35 may give the signal generator 37 an instruction to generate the pulse signal Spulse, when the foreign-matter detection D2 is made in the power feeding. In addition, the controller 35 may receive the amplitude AMP from the amplitude measurement unit 39, and calculate two thresholds AMPth1 and AMPth2, on the basis of the amplitude AMP. Here, the threshold AMPth1 may be larger than the threshold AMPth2. After that, the controller 35 may generate the power feeding control signals CTL, on the basis of whether the amplitude AMP to be received afterward falls within a range between the thresholds AMPth1 and AMPth2.

Moreover, the controller 35 may also have a function of giving the load coupling unit 34 the instruction to couple the regulator 33 to the load or to decouple the regulator 33 from the load.

The charging controller 22 may control charging operation of the secondary battery 23. The secondary battery 23 may store direct current power, and include, for example, a rechargeable battery such as a lithium ion battery. Furthermore, the secondary battery 23 may supply the electric power to various circuits and devices provided for fulfillment of functions of the smartphone 20 (in this example, the operation unit 24, the display unit 25, the communication unit 26, the storage unit 27, and the controller 28).

The operation unit 24 may be a user interface provided for operating the smartphone 20, and include, for example, various buttons and a touch panel. The display unit 25 may display various results of information processing in the smartphone 20. The communication unit 26 may perform communication with a base station for portable phones. The storage unit 27 may store various programs to be executed in the smartphone 20. The controller 28 may execute the programs stored in the storage unit 27 and control each block in the smartphone 20.

Herein, the power receiving coil 311 corresponds to a concrete example of a "power receiving element" in the disclosure. The power receiving coil 311, the rectification circuit 32, the regulator 33, the load coupling unit 34, and the controller 35 correspond to a concrete example of a "power generator" in the disclosure. The signal generator 37, the detection coil 381, and the amplitude measurement unit 39 correspond to a concrete example of a "detector" in the disclosure. The detector 35 and the communication unit 36 correspond to a concrete example of a "controller" in the disclosure.

[Operation and Workings]

Next, a description is given of operation and workings of the power feeding system 1 in this embodiment.

(Outline of General Operation)

A description is given first of an outline of general operation of the power feeding system 1, with reference to FIGS. 2 to 4. In the power feeding device 10, the AC/DC converter 11 may convert the alternating current power signal supplied from the AC power supply 9 into the direct current power signal, and supply the direct current power signal to the power transmission driver 12. The power transmission driver 12 may generate the signal Sac1 or Sac2 and the power signal Sp1 on the basis of the direct current power signal supplied from the AC/DC converter 11. The power feeding coil 131 may generate the electromagnetic field on the basis of the signal Sac1 or Sac2 and the power signal Sp1. The current detector 14 may detect the current flowing through the power feeding coil 131. The communication unit 15 may receive the power feeding control signal CTL from the power receiving device 30. The detector 16 may detect whether the object (e.g., the smartphone 20) is placed on the power feeding device 10. The quality factor measurement unit 17 may determine the quality factor Q during the foreign-matter detection D1 before the power feeding. The controller 18 may control the transmission driver 12, thereby controlling the power feeding operation to the power receiving device 30.

In the power receiving device 30, the power receiving coil 311 may generate, on the basis of the electromagnetic field generated by the power feeding coil 131, the induced voltage corresponding to the change in the magnetic flux thereof. Moreover, the power receiving coil 311 and the capacitative elements 312 and 313 may supply the rectification circuit 32 with the power signal Sp2 that corresponds to the power signal Sp1. The rectification circuit 32 may rectify the power signal Sp2 to generate the direct current signal having the receiving voltage Vrect. The regulator 33 may generate the direct current power having the voltage Vreg on the basis of the direct current signal supplied from the rectification circuit 32. The load coupling unit 34 may form the coupling of the regulator 33 to the load on the basis of the instruction from the controller 35. The communication unit 36 may transmit the power feeding control signal CTL to the power feeding device 10. The signal generator 37 may generate the pulse signal Spulse, on the basis of the instruction from the controller 35, when the foreign-matter detection D2 is made in the power feeding. The detection coil 381 may generate the electromagnetic field on the basis of the pulse signal Spulse. The amplitude measurement unit 39 may measure the amplitude AMP of the signal generated across the ends of the power feeding coil 381 when the foreign-matter detection D2 is made. The controller 35 may generate the power feeding control signal CTL, thereby controlling the power feeding operation of the power feeding system 1.

The charging controller 22 may control the charging operation of the secondary battery 23. The secondary battery 23 may store the direct current power and supply the electric power to various circuits and devices provided for the fulfillment of the functions of the smartphone 20.

(Detailed Operation)

FIG. 7 is a flowchart of the power feeding operation of the power feeding system 1. The power feeding system 1 may make the foreign-matter detection D1, thereafter, start the power feeding, and make the foreign-matter detection D2 in the power feeding. Details are described below.

Once a user places the smartphone 20 on the power feeding surface of the power feeding device 10, the power feeding device 10 may detect the smartphone 20 (Step S1). More specifically, first, the power transmission driver 12 in the power feeding device 10 may generate the alternating current signal Sac1, while the detector 16 may detect the signal across the ends of the power feeding coil 131. Moreover, the detector 16 may detect the change in the amplitude and the change in the phase of the signal, to detect the presence or the absence of the smartphone 20, and supply the detection result to the controller 18.

Thereafter, the power feeding device 10 may measure the quality factor Q (Step S2). More specifically, the power transmission driver in the power feeding device 10 may generate the alternating current signal Sac2. The quality factor measurement unit 17 may determine the quality factor Q on the basis of the voltages at the respective ends of the capacitative element 132.

Thereafter, the power feeding device 10 may start the power feeding to the power receiving device 30 in the smartphone 20 (Step S3). On this occasion, the power feeding device 10 may perform the power feeding with small feeding power.

Thereafter, the power receiving device 30 may start up with the electric power supplied from the power feeding device 10 and transmit the device information INF to the power feeding device 10 (Step S4). More specifically, in the power receiving device 30, upon receipt of the electric power fed from the power feeding device 10, the rectification circuit 32 may generate the receiving voltage Vrect. The regulator 33 may generate the voltage Vreg on the basis of the receiving voltage Vrect. By using the voltage Vreg as the power supply voltage, each block in the power receiving device 30 may start their operation. After that, the controller 35 in the power receiving device 30 may generate the power feeding control signal CTL that includes the device information INF regarding the quantity and/or the layout of the conductor contained in the smartphone 20. The communication unit 36 may transmit the power feeding control signal CTL to the power feeding device 10.

Thereafter, the power feeding device 10 may calculate the threshold Qth (Step S5) and check whether the quality factor Q that has been measured at Step S2 is larger than the threshold Qth (Q>Qth) (Step S6). More specifically, first, the communication unit 15 in the power feeding device 10 may receive the power feeding control signal CTL including the device information INF, and supply the power feeding control signal CTL to the controller 18. Moreover, on the basis of the device information INF, the controller 18 may calculate the threshold Qth and compare the quality factor Q with the threshold Qth. In other words, the quality factor Q may take different values, depending on the quantity and/or the layout of the conductor contained in the smartphone 20. Therefore, the controller 18 may calculate the threshold Qth in accordance with the quantity and/or the layout of the conductor and compare the quality factor Q with the threshold Qth.

At Step S6, when the quality factor Q is equal to or smaller than the threshold Qth ("N" at Step S6), the flow may proceed to Step S13. In other words, in this case, the controller 18 in the power feeding device 10 may determine the presence of some metal piece or other foreign matter between the power feeding device 10 and the smartphone 20, and make the flow proceed to Step S13 in order to stop the power feeding.

At Step S6, when the quality factor Q is larger than the threshold Qth ("Y" at Step S6), the signal generator 37 in the power receiving device 30 may start to generate the pulse signal Spulse (Step S7). More specifically, the controller 35 in the power receiving device 30 may give the signal generator 37 the instruction to generate the pulse signal Spulse, and the signal generator 37 may start to generate the pulse signal Spulse. After that, the signal generator 37 may keep generating the pulse signal Spulse until the charging of the secondary battery 23 is finished.

Thereafter, the power receiving device 30 may measure the amplitude AMP and calculate the thresholds AMPth1 and AMPth2 on the basis of the amplitude AMP (Step S8). More specifically, first, the amplitude measurement unit 39 may measure the amplitude AMP of the signal generated across the ends of the power feeding coil 381, during the period in which the signal generator 37 generates each pulse part P1 of the pulse signal Spulse. Moreover, the controller 35 may calculate the thresholds AMPth1 and AMPth2 on the basis of the amplitude AMP.

Thereafter, the power receiving device 30 may start the charging of the secondary battery 23 (Step S9). More specifically, first, the controller 35 may request the power feeding device 10 to increase or decrease the feeding power, through the power feeding control signal CTL, thereby controlling the feeding power so that the receiving voltage Vrect reaches a target voltage. Moreover, the controller 35 may give the load coupling unit 34 the instruction to couple the regulator 33 to the load. On the basis of the instruction, the load coupling unit 34 may couple the regulator 33 to the charging controller 22. In this way, the power receiving device 30 may cause the charging controller 22 to start the charging of the secondary battery 23.

Thereafter, the power receiving device 30 may measure the amplitude AMP (Step S10) and check whether the amplitude AMP is smaller than the threshold AMPth1 (AMP<AMPth1) and larger than the threshold AMPth2 (AMP>AMPth2) (Step S11). More specifically, first, the amplitude measurement unit 39 may measure the amplitude AMP of the signal generated across the ends of the power feeding coil 381. Thereafter, the controller 35 may check whether the amplitude AMP falls within an amplitude range with its upper limit set to the threshold AMPth1 and its lower limit set to the threshold AMPth2.

At Step S11, when the amplitude AMP is equal to or larger than the threshold AMPth1, or when the amplitude AMP is equal to or smaller than the threshold AMPth2 ("N" at Step S11), the flow may proceed to Step S13. In other words, in this case, the controller 35 in the power receiving device 30 may determine the presence of some metal piece or other foreign matter between the power feeding device 10 and the smartphone 20 and make the flow proceed to Step S13 in order to stop the power feeding.

At Step S11, when the amplitude AMP is smaller than the threshold AMPth1 and larger than the threshold AMPth2 ("Y" at Step S11), the controller 35 may determine whether the charging of the secondary battery 23 has been finished (Step S12). More specifically, the controller 35 may determine whether the charging of the secondary battery 23 has been finished, on the basis of, for example, a voltage of the secondary battery 23 or a current supplied to the secondary battery 23.

At Step S12, upon determination that the charging of the secondary battery 23 has not yet been finished ("N" at Step S12), the flow may return to Step S10. The controller 35 may repeat Steps S10 to S12 until the charging has been finished.

At Step S12, when the controller 35 determines that the charging of the secondary battery 23 has been finished ("Y" at Step S12), the power feeding device 10 may stop the power feeding (Step S13). More specifically, the controller 35 may give the load coupling unit 34 the instruction to decouple the regulator 33 from the load. On the basis of the instruction, the load coupling unit 34 may decouple the regulator 33 from the charging controller 22. Simultaneously, the controller 35 may generate the power feeding control signal CTL containing a request for stopping the power feeding. The communication unit 36 may transmit the power feeding control signal CTL to the power feeding device 10. Moreover, in the power feeding device 10, the communication unit 15 may receive the power feeding control signal CTL. On the basis of the power feeding control signal CTL, the controller 18 may control the power transmission driver 12 to stop the power feeding.

Through the above operations, this operation flow may be concluded.

As described above, in the power feeding system 1, the foreign-matter detection D1 may be made on the basis of the quality factor Q, before the power feeding. This makes it possible to detect the foreign matter with high precision. In particular, in the foreign-matter detection D1, the quality factor Q may be measured before the power feeding. Accordingly, it is possible to reduce possibility of being affected by a noise and/or the load (the power receiving device 30), as compared to a case of measurement in the power feeding. Furthermore, the threshold Qth may be determined on the basis of the device information INF. Accordingly, the threshold Qth may be determined in consideration of the quantity and/or the layout of the conductor contained in an electronic apparatus to which the electric power is supplied (in this example, the smartphone 20). This enables the power feeding system 1 to detect the foreign matter with high precision, and to perform the power feeding with enhanced safety.

Moreover, the power feeding system 1 may make the foreign-matter detection D1 before the power feeding, and make the foreign-matter detection D2 in the power feeding. More specifically, the power feeding system 1 may check the absence of the foreign matter through the foreign-matter detection D1, and thereafter, start the charging of the secondary battery 23 (described later). The power feeding system 1 may stop the charging if any foreign matter is detected afterward through the foreign-matter detection D2. Accordingly, in the power feeding system 1, it is possible to detect the foreign matter and to stop the power feeding, even in a case in which, for example, the foreign matter such as the metal piece is inserted between the power feeding device 10 and the smartphone 20 after the start of the power feeding. This enables the power feeding with enhanced safety.

Furthermore, the power receiving device 30 may include the detection coil 381 and make the foreign-matter detection D2 by using the detection coil 381. This makes it possible to detect the foreign matter in a simple way. Specifically, for example, detecting the foreign matter with use of the power receiving coil 311 may result in suspension of the power feeding every time the foreign matter is detected, causing possibility of complicated operation. In contrast, the power receiving device 30 may include the detection coil 381 for the foreign-matter detection D2 independently of the power receiving coil 311. Therefore, it is possible to detect the foreign matter without having to stop the power feeding operation.

In addition, in the power receiving device 30, the frequency of the pulse signal Spulse in each pulse part P1 may differ from the frequency of the power signal Sp1. This makes it possible to detect the foreign matter with high precision. Specifically, for example, allowing the frequency of the pulse signal Spulse in each pulse part P1 to be the same as the frequency of the power signal Sp1 may cause the amplitude AMP measured by the amplitude measurement unit 39 to be affected by the power signal Sp1. In contrast, in the power receiving device 30, these frequencies may differ from each other. Accordingly, for example, providing the amplitude measurement unit 30 with a filter makes it possible to suppress an influence of the power signal Sp1, and to measure the amplitude AMP with higher precision. Consequently, in the power receiving device 30, it is possible to detect the foreign matter with high precision.

Further, in the power receiving device 30, the thresholds AMPth1 and AMPth2 may be determined on the basis of the amplitude AMP. This makes it possible to detect the foreign matter with high precision. Specifically, the amplitude AMP may vary depending on not only the presence or the absence of the foreign matter but also the power feeding device to be used. The power feeding device may be provided by various vendors. Therefore, the amplitude AMP may vary depending on the power feeding device to be used, even in the case of the absence of the foreign matter. For example, allowing the threshold to be a fixed value may lead to possibility of an error in the detection of the foreign matter, depending on the power feeding device to be used. In contrast, in the power receiving device 30, the thresholds AMPth1 and AMPth2 may be determined on the basis of the amplitude AMP. This makes it possible to set the thresholds AMPth1 and AMPth2 that vary depending on the power feeding device to be used. Consequently, it is possible to detect the foreign matter with high precision.

In particular, the power feeding system 1 may check the absence of the foreign matter through the foreign-matter detection D1, and thereafter, determine the thresholds AMPth1 and AMPth2 for the foreign-matter detection D2. In this way, in the power feeding system 1, it is possible to determine the thresholds AMPth1 and AMPth2 without being affected by the foreign matter, thereby making it possible to detect the foreign matter with high precision.

Moreover, the power receiving device 30 may check whether the amplitude AMP falls within the amplitude range between the thresholds AMPth1 and AMPth2. Accordingly, it is possible to detect both a case where the amplitude AMP increases due to the foreign matter and a case where the amplitude AMP decreases due to the foreign matter. As a result, in the power receiving device 30, it is possible to detect the foreign matter with high precision.

[Effects]

As described above, this embodiment may involve providing a detection coil and detecting a foreign matter by using the detection coil. Hence, it is possible to detect the foreign matter in a simple way.

In this embodiment, a frequency of a pulse signal in each pulse part may differ from a frequency of a power signal. Hence, it is possible to detect the foreign matter with high precision.

This embodiment may involve checking absence of the foreign matter, and thereafter, determining thresholds on the basis of amplitude AMP. Hence, it is possible to detect the foreign matter with high precision.

[Modification 1]

In the foregoing embodiment, in the foreign-matter detection D2, the check is made on whether the amplitude AMP falls within the amplitude range between the thresholds AMPth1 and AMPth2. However, this is non-limiting. As one alternative configuration example, if it is already found that the amplitude AMP decreases due to the presence of the foreign matter, a single threshold may be calculated at Step S8. At Step S11, when the amplitude AMP is smaller than the threshold, the power feeding may be stopped.

[Modification 2]

In the foregoing embodiment, the foreign-matter detection D2 is made on the basis of the amplitude AMP of the signal across the ends of the detection coil 381. However, this is non-limiting. As one alternative example, the foreign-matter detection D2 may be made on the basis of a phase PH of the signal across the ends of the detection coil 381. In the following, a power receiving device 30A according to this modification is described in detail.

FIG. 8 illustrates an exemplary configuration of the power receiving device 30A. The power receiving device 30A may include a phase measurement unit 39A and a controller 35A. The phase measurement unit 39A may measure the phase PH of the signal generated across the ends of the power feeding coil 381, when the foreign-matter detection D2 is made. More specifically, as with the controller 35, the controller 35A may receive the phase PH from the phase measurement unit 39A, and calculate two thresholds PHth1 and PHth2, on the basis of the phase PH, in making the foreign-matter detection D2. Here, the threshold PHth1 may be larger than the threshold PHth2. After that, the controller 35A may make the foreign-matter detection D2, on the basis of whether the phase PH to be received afterward falls within a range between the two thresholds PHth1 and PHth2.

FIG. 9 illustrates exemplary operation of a power feeding system 1A including the power receiving device 30A. In this power feeding system 1A, at Step S7, the signal generator 37 in the power receiving device 30A may start to generate the pulse signal Spulse. Thereafter, the power receiving device 30A may measure the phase PH and calculate the thresholds PHth1 and PHth2 on the basis of the phase PH (Step S38). More specifically, first, the phase measurement unit 39A may measure the phase PH of the signal generated across the ends of the power feeding coil 381, during the period in which the signal generator 37 generates each pulse part P1 of the pulse signal Spulse. On the basis of the phase PH, the controller 35A may calculate the thresholds PHth1 and PHth2. Thereafter, the power receiving device 30A may start to charge the secondary battery 23, as in the foregoing embodiment (Step S9). After that, the power receiving device 30A may measure the phase PH (Step S40) and check whether the phase PH is smaller than the threshold PHth1

(PH<PHth1) and larger than the threshold PHth2 (PH>PHth2) (Step S41). When the phase PH is equal to or larger than the threshold PHth1, or when the phase PH is equal to or smaller than the threshold PHth2 ("N" at Step S41), the flow may proceed to Step S13 to stop the power feeding. With this configuration as well, it is possible to produce substantially the same effects as those of the power receiving device 30 in the foregoing embodiment.

It is to be noted that this is non-limiting. As one alternative example, the foreign-matter detection D2 may be made on the basis of both the amplitude AMP and the phase PH of the signal across the ends of the detection coil 381. This allows for enhancement in a degree of freedom of the foreign-matter detection.

[Modification 3]

In the foregoing embodiment, the power receiving device 30 includes, for example, the detection coil 381, but this is non-limiting. As one alternative example, if a coil is provided in a part of a smartphone other than a power receiving device, the foreign-matter detection D2 may be made by using this coil. This modification is described below in detail.

FIG. 10 illustrates an exemplary configuration of a smartphone 20B according to this modification. The smartphone 20B may include an NFC (near field communication) communication unit 40B, a power receiving device 30B, and a controller 28B.

FIG. 11 illustrates an exemplary configuration of the NFC communication unit 40B. The NFC communication unit 40B may perform so-called short-distance wireless communication with another electronic apparatus. The NFC communication unit 40B may include a transmitter 41, a communication coil 421, a capacitative element 422, and a receiver 43. The transmitter 41 may transmit data to the relevant electronic apparatus with use of the communication coil 421 and the capacitative element 422, on the basis of an instruction from the controller 28B. The receiver 43 may receive the data from the relevant electronic apparatus with use of the communication coil 421 and the capacitative element 422, and supply the received data to the controller 28B. The receiver 43 may include a so-called IQ demodulator, for example.

FIG. 12 illustrates an exemplary configuration of the power receiving device 30B. The power receiving device 30B may be equivalent to the power receiving device 30 in the foregoing embodiment from which the signal generator 37, the detection coil 381, the capacitative element 382, and the amplitude measurement unit 39 are eliminated and in which the controller 35 is replaced with a controller 35B. The controller 35B may generate the power feeding control signal CTL, as with the controller 35 in the foregoing embodiment. Moreover, the controller 35B may control, through a control signal M1, the transmitter 41 in the NFC communication unit 40B to generate the pulse signal Spulse, and control, through the control signal M1, the receiver 43 to measure the amplitude AMP of a signal across both ends of the communication coil 421. In addition, the controller 35B may acquire the amplitude AMP measured by the receiver 43.

The controller 28B may execute the program stored in the storage unit 27, as with the controller 28 in the foregoing embodiment and control each block in the smartphone 20. In addition, the controller 28B may control the NFC communication unit 40B on the basis of the control signal M1.

This configuration allows the smartphone 20B to perform the short-distance wireless communication with the relevant electronic apparatus by using the NFC communication unit 40B. Furthermore, in the power feeding, the power receiving device 30B may detect the foreign matter by making efficient use of the NFC communication unit 40B. This leads to reduction in the number of components, achieving a cost reduction. Moreover, when the power receiver 43 includes the IQ demodulator, it is possible to detect both the amplitude AMP and the phase PH, for example. This contributes to enhance the degree of freedom of the foreign-matter detection.

[Modification 4]

In the foregoing embodiment, at Step S11, when the amplitude AMP is equal to or larger than the threshold AMPth1, or when the amplitude AMP is equal to or smaller than the threshold AMPth2 ("N" at Step S11), the power feeding is stopped (Step S13), and the flow is concluded. However, this is non-limiting. As one alternative example, as illustrated in FIG. 13, in a case of "N" at Step S11, the power feeding may be stopped (Step S21) as with Step S13. Thereafter, the flow may return to Step S2, and start again at the foreign-matter detection D1.

[Modification 5]

In the foregoing embodiment, the calculation of the thresholds AMPth1 and AMPth2 is made before the start of the charging at Step S9. However, this is non-limiting. As an alternative example, as illustrated in FIG. 14, the calculation of the thresholds AMPth1 and AMPth2 may be made after the start of the charging. In this example, at Step S6, when the quality factor Q is larger than the threshold Qth ("Y" at Step S6), the power receiving device 30 may start to charge the secondary battery 23, as in Step S9 (Step S27). After that, the signal generator 37 in the power receiving device 30 may start to generate the pulse signal Spulse, as in Step S7 (Step S28). The controller 35 may measure the amplitude AMP and calculate the thresholds AMPth1 and AMPth2 on the basis of the amplitude AMP, as in Step S8 (Step S29). With this flow as well, it is possible to produce substantially the same effects as those of the power receiving device 30 in the foregoing embodiment.

[Modification 6]

In the foregoing embodiment, the power receiving device 30 is provided with the detection coil 381, and the power receiving device 30 makes the foreign-matter detection D2 in the power feeding. However, this is non-limiting. As one alternative example, as in a power feeding device 50 illustrated in FIG. 15, the power feeding device 50 may be provided with a detection coil, and the power feeding device 50 may make the foreign-matter detection D2. The power feeding device 50 may include a signal generator 51, a detection coil 521, a capacitative element 522, an amplitude measurement unit 53, and a controller 58. The signal generator 51, the detection coil 521, the capacitative element 522, and the amplitude measurement unit 53 correspond respectively to the signal generator 37, the detection coil 381, the capacitative element 382, and the amplitude measurement unit 39 in the first embodiment. The controller 58 may control the transmission driver 12, thereby controlling the power feeding operation, as with the controller 18 in the first embodiment. Moreover, the controller 58 may have the function of controlling the foreign-matter detection D2 in the power feeding, as with the controller 35 in the first embodiment. More specifically, when the foreign-matter detection D2 is made in the power feeding, the controller 58 may give the signal generator 51 the instruction to generate the pulse signal Spulse, and receive the amplitude AMP from the amplitude measurement unit 53 to calculate the thresholds AMPth1 and AMPth2 on the basis of the amplitude AMP. Moreover, the controller 58 may control the power supply transmission driver 12, on the basis of whether the amplitude AMP to be received afterward falls within the range between the thresholds AMPth1 and AMPth2. This configuration enables the power feeding device 50 to stop the power feeding by itself after having detected the foreign matter through the foreign-matter detection D2 in the power feeding.

[Modification 7]

In the foregoing embodiment, the power receiving device 30 includes the detection coil 381 and makes the foreign-matter detection D2 by using the electromagnetic field generated by the detection coil 381. However, this is non-limiting. As one alternative example, as illustrated in FIG. 16, a power receiving device 30F may be provided with two detection electrodes 381A and 381B and make the foreign-matter detection D2 by using an electric field generated between the two detection electrodes 381A and 381B.

[Modification 8]

In the foregoing embodiment, the electric power supply is performed by virtue of electromagnetic induction. However, this is non-limiting. As one alternative example, the electric power supply may be performed by virtue of electromagnetic coupling. A power feeding system 2 according to this modification is described below in detail.

FIG. 17 illustrates an exemplary configuration of the power feeding system 2. The power feeding system 2 may include a power feeding device 60 and a smartphone 70. Two power feeding electrodes 61A and 61B (described later) may be disposed on a power feeding surface of the power feeding device 60 (on side on which contact with the smartphone 70 is made). Two power receiving electrodes 71A and 71B (described later) may be disposed on a lower surface of the smartphone 70 (on side on which contact with the power feeding device 60 is made). The power feeding device 60 may perform the power feeding to a power receiving device 80 (described later) in the smartphone 70, with use of these electrodes, by virtue of electromagnetic coupling.

FIG. 18 schematically illustrates cross-sections of the power feeding device 60 and the smartphone 70. This example represents a state in which the power feeding operation is performed, with the smartphone 70 mounted on the power feeding device 60.

The power feeding device 60 may include the two power feeding electrodes 61A and 61B. The power feeding electrodes 61A and 61B may be disposed on a surface on which the contact with the smartphone 70 is made (the power feeding surface). Each of the power feeding electrodes 61A and 61B may be covered with an insulator 8. Accordingly, the power feeding electrodes 61A and 61B may be respectively electromagnetically coupled to the power receiving electrodes 71A and 71B in the smartphone 70 with, for example, the insulator 8 therebetween.

The smartphone 70 may include the two power receiving electrodes 71A and 71B. The power receiving electrodes 71A and 71B may be disposed on a surface on which the contact with the power feeding device 60 is made (the power receiving surface). The power receiving electrode 71A may be positioned so as to face the power feeding electrode 61A in the power feeding device 60. The power receiving electrode 71B may be positioned so as to face the power feeding electrode 61B in the power feeding device 60. Each of the power receiving electrodes 71A and 71B may be covered with an insulator 9. Accordingly, the power receiving electrodes 71A and 71B may be respectively electromagnetically coupled to the power feeding electrodes 61A and 61B in the power feeding device 60 with, for example, the insulator 9 therebetween.

FIG. 19 illustrates an exemplary configuration of the power feeding device 60. The power feeding device 60 may include the AC/DC converter 11, the power transmission driver 12, the current detector 14, the communication unit 15, the detector 16, and a controller 68. The controller 68 may control the transmission driver 12, thereby controlling the power feeding operation to the power receiving device 70, as with the controller 18 in the forgoing embodiment. In one configuration example, the power feeding device 60 may be kept from making the foreign-matter detection D1 using the quality factor Q. It is to be noted that this is non-limiting. Alternatively, the foreign-matter detection D1 may be made in another way. The power feeding electrode 61A may be coupled to the first output terminal of the power transmission driver 12, whereas the power feeding electrode 61B may be coupled to the second output terminal of the power transmission driver 12 through the current detector 14.

FIG. 20 illustrates an exemplary configuration of the power receiving device 80 in the smartphone 70. The power receiving device 80 may include the rectification circuit 32, the regulator 33, the load coupling unit 34, the controller 35, the communication unit 36, the signal generator 37, the detection coil 381, the capacitative element 382, and the amplitude measurement unit 39, as with the power receiving device 30 in the foregoing embodiment. The power receiving electrode 71A may be coupled to the first input terminal of the rectification circuit 32, whereas the power receiving electrode 71B may be coupled to the second input terminal of the rectification circuit 32.

With this configuration as well, it is possible to produce substantially the same effects as those of the power feeding system 1 in the foregoing embodiment.

[Other Modifications]

Moreover, two or more of these modifications may be combined.

Although description has been made by giving the embodiment and the modifications as mentioned above, the contents of the technology are not limited to the above-mentioned example embodiments and may be modified in a variety of ways.

As one example, in the forgoing example embodiments, the power receiving device 30, for example, transmits the power feeding control signal CTL to the power feeding device 10, by virtue of the load modulation. However, this is non-limiting. Alternatively, the power feeding control signal CTL may be transmitted by virtue of Bluetooth, for example.

As another example, in the forgoing example embodiments, the capacitative element 313 is provided in the power receiving device 30, for example. However, this is non-limiting. Alternatively, for example, the capacitative element 313 may be omitted.

It is to be noted that effects described herein are merely exemplified and not limitative, and effects of the disclosure may be other effects or may further include other effects.

It is to be noted that the technology may have the following configuration.

(1) A power receiving device including:
a power generator including a power receiving element that receives a power signal supplied in a wireless manner from a power feeding device, the power generator generating direct current power on the basis of the power signal;

a detector including a detection element, the detector driving the detection element and detecting an alternating current signal generated in the detection element, during a power receiving period in which the power receiving element receives the power signal; and
a controller that controls the power feeding device on the basis of a detection result of the detector.

(2) The power receiving device according to (1), wherein the detector drives the detection element in an intermittent manner,
the controller
sets a determination condition on the basis of one detection result of a plurality of detection results of the detector, and
controls the power feeding device in response to whether each of detection results subsequent to the one detection result satisfies the determination condition.

(3) The power receiving device according to (2), wherein the power feeding device detects absence of a foreign matter between the power feeding device and the power receiving device, and
the detector acquires the one detection result after the power feeding device has detected the absence of the foreign matter.

(4) The power receiving device according to (2) or (3), wherein
the controller controls the power feeding device to stop power feeding when any of the detection results fails to satisfy the determination condition.

(5) The power receiving device according to any one of (1) to (4), wherein
the detector detects amplitude or a phase, or both of the alternating current signal.

(6) The power receiving device according to any one of (1) to (5), wherein
a frequency of the alternating current signal differs from a frequency of the power signal.

(7) The power receiving device according to any one of (1) to (6), wherein
the detector drives the detection element by using a pulse signal.

(8) The power receiving device according to any one of (1) to (7), wherein
the power receiving element includes a coil.

(9) The power receiving device according to any one of (1) to (7), wherein
the power receiving element includes an electrode.

(10) The power receiving device according to any one of (1) to (9), wherein
the detection element includes a coil.

(11) The power receiving device according to any one of (1) to (9), wherein
the detection element includes an electrode.

(12) A power feeding device including:
a power feeder including a power feeding element, the power feeder generating a power signal to be supplied in a wireless manner to a power receiving device and outputting the power signal through the power feeding element;
a detector including a detection element, the detector driving the detection element and detecting an alternating current signal generated in the detection element, during a power feeding period in which the power feeding element outputs the power signal; and
a controller that controls the power feeder on the basis of a detection result of the detector.

(13) An electronic apparatus including:
a power receiving device; and
a communication unit including a communication coil, the communication unit performing communication with an external apparatus by using the communication coil,
the power receiving device including
a power generator including a power receiving element that receives a power signal supplied in a wireless manner from a power feeding device, the power generator generating direct current power on the basis of the power signal, and
a controller that controls the communication unit to drive the communication coil and to make detection of an alternating current signal generated in the communication coil, during a power receiving period in which the power receiving element receives the power signal, and controls the power feeding device on the basis of a result of the detection.

(14) The electronic apparatus according to (13), wherein the communication unit performs short-distance wireless communication.

This application claims the benefit of Japanese Priority Patent Application JP2014-141505 filed on Jul. 9, 2014, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A power feeding device comprising:
power feeding circuitry including a power feeding element, the power feeding circuitry generating a power signal to be supplied in a wireless manner to a power receiving device and outputting the power signal through the power feeding element;
a first detection circuitry connected to the power feeding circuitry, the first detection circuitry configured to detect a measured quality factor from the power feeding circuitry, compare the measured quality factor to a threshold quality factor corresponding to the power receiving device, and continue a power feeding period in which the power feeding element outputs the power signal if the measured quality factor exceeds the threshold quality factor;
a signal generator that generates a pulse signal;
a detection element that is connected to the signal generator to receive the pulse signal and generate an alternating current signal;
second detection circuitry connected to the detection element and configured to receive a detected signal that corresponds to the alternating current signal, the detected signal being received during the power feeding period in which the power feeding element outputs the power signal; and
a controller that determines a detection result corresponding to at least one of an amplitude or a phase of the detected signal, and that controls whether to continue the power feeding period on a basis of the detection result.

2. The power feeding device according to claim 1, wherein
the detection result is one of a plurality of detection results intermittently determined by the controller, wherein the controller sets a determination condition on a basis of a first detection result of the plurality of detection results, and controls the power feeding device to terminate the power feeding period if any of the plurality of detection results subsequent to the first detection result fails to satisfy the determination condition.

3. The feeding device according to claim 2, wherein the power feeding device detects absence of a foreign matter between the power feeding device and the power receiving device, and the controller determines the first detection result after the power feeding device has detected the absence of the foreign matter.

4. The power feeding device according to claim 2, wherein the determination condition is whether at least one of the amplitude or the phase of the detected signal of the corresponding detection result is outside of a range.

5. The power feeding device according to claim 4, wherein respective upper and lower threshold values of the range are determined on the basis of the first detection result of the plurality of detection results.

6. The power feeding device according to claim 4, wherein the determination condition comprises whether the amplitude of the detected signal of the corresponding detection result is outside of the range.

7. The power feeding device according to claim 4, wherein the determination condition comprises whether the phase of the detected signal of the corresponding detection result is outside of the range.

8. The power feeding device according to claim 1, wherein a frequency of the alternating current signal differs from a frequency of the power signal.

9. The power feeding device according to claim 1, wherein the detection element includes a coil.

10. The power feeding device according to claim 1, wherein the detection element includes an electrode.

* * * * *